United States Patent
Hanby, IV

(10) Patent No.: US 12,373,249 B2
(45) Date of Patent: Jul. 29, 2025

(54) RESOURCE AND TASK MANAGEMENT SYSTEM

(71) Applicant: Hanby Technologies, Inc., Austin, TX (US)

(72) Inventor: John Byron Hanby, IV, Austin, TX (US)

(73) Assignee: Hanby Technologies, Inc., Austin, TX (US)

( * ) Notice: Subject to any disclaimer, the term of this patent is extended or adjusted under 35 U.S.C. 154(b) by 533 days.

(21) Appl. No.: 17/889,720

(22) Filed: Aug. 17, 2022

(65) Prior Publication Data

US 2023/0065120 A1 Mar. 2, 2023

Related U.S. Application Data

(60) Provisional application No. 63/234,348, filed on Aug. 18, 2021.

(51) Int. Cl.
*G06F 9/48* (2006.01)
(52) U.S. Cl.
CPC .................................. *G06F 9/4881* (2013.01)
(58) Field of Classification Search
None
See application file for complete search history.

(56) References Cited

U.S. PATENT DOCUMENTS

| | | | |
|---|---|---|---|
| 8,566,438 B2 * | 10/2013 | Wisniewski | H04L 51/234 709/224 |
| 11,307,910 B2 * | 4/2022 | Chu | G06F 9/542 |
| 11,379,219 B2 * | 7/2022 | Bhalla | G06Q 10/06313 |
| 2005/0120108 A1 * | 6/2005 | Wisniewski | H04L 51/234 709/224 |
| 2009/0133027 A1 * | 5/2009 | Gunning | G06Q 10/06 718/103 |
| 2015/0356483 A1 * | 12/2015 | Saliba | G06F 16/2237 705/7.24 |
| 2020/0159525 A1 * | 5/2020 | Bhalla | G06F 21/577 |
| 2021/0374543 A1 * | 12/2021 | Matsumoto | G06V 10/764 |

* cited by examiner

*Primary Examiner* — Van H Nguyen
(74) *Attorney, Agent, or Firm* — Pillsbury Winthrop Shaw Pittman LLP

(57) ABSTRACT

Systems and methods of task and resource management that include receiving a plurality of tasks, assigning a context tag to each of the plurality of tasks based on a comparison between the plurality of tasks and existing tasks stored in a database, filtering the plurality of tasks based on the context tag assigned to each of the plurality of tasks, calculating, for each of the plurality of tasks, task values associated with relationships between each of the plurality of tasks and any sub-tasks corresponding to each of the plurality of tasks, sorting the task values and assigning prioritization to each of the plurality of tasks, storing the task values and the prioritization assigned to each of the plurality of tasks in the database.

20 Claims, 11 Drawing Sheets

| Order | Task Name | Calculated Value |
|---|---|---|
| 1 | Task 1 | 0.1 |
| 2 | Task 2 | 0.08 |
| 3 | Task 3 | 0.045 |
| 4 | Task 4 | 0.03 |
| 5 | Task 5 | 0.009 |

FIG. 2

RESOURCE AND TASK MANAGEMENT SYSTEM

CROSS-REFERENCE TO RELATED APPLICATIONS

This application is a continuation of U.S. Provisional App. 63/234,348, filed on Aug. 18, 2021, which is incorporated herein by reference in its entirety.

BACKGROUND

Technical Field

This patent application relates to techniques to reduce computational complexity in computer processes solving or approximating solutions to the maximum generalized assignment problem.

Description of Related Art

The generalized assignment problem has various industrial and organizational applications. In this class of computing tasks, the problem typically includes a plurality of agents (e.g., workers, servers, robots, manufacturing process tools, etc.) and a plurality of tasks (e.g., transforming a workpiece, writing some code to implement a feature in an application, servicing an application-program interface request, etc.) Different tasks have varying utilities and consume varying amounts of generally constrained computing or other system resources, with some agents having differing constraints and utilities per unit of resources consumed. Solutions to the generalized assignment problem maximize aggregate utility subject to those resource constraints. The problem is classified as NP-hard (or non-deterministic polynomial-time hard), meaning that for many applications of commercially relevant scale, solutions (which may include numerical approximations) are not computationally feasible with existing computer-implemented approaches.

SUMMARY

The following is a non-exhaustive listing of some aspects of the present techniques. These and other aspects are described in the following disclosure.

What is provided is a system and methods for a system that enables a new way of calculating, organizing, and structuring strategic objectives and tasks. The system provides Outcome and Value Driven Management™ of work which unlocks efficiencies for leaders, and freedom for individual contributors to think creatively and develop new innovations around strategic objectives. The system makes it easy to capture, illustrate, visualize, and understand the interconnected nature of business objectives and create a quantifiable, clear, and concrete system for employees of all levels to align towards a single focused vision while being able to factor in business limitations and priority. As such, the systems and methods discussed herein do not suffer from the drawbacks of conventional systems. For example, the system provides advantages over conventional techniques by automating processes for connecting active objectives in queue directly with a Workspace used for the collection, ideation, and collaboration, while simultaneously factoring relationship models between organizational strategic objectives and sub-objectives to develop intellectual property. The strategic objectives and other metrics utilized within the system and output by the system may be in any form, such as, but not limited to priority lists, tasks, financial models, resource availability calculations, human capital allocations (people), annual plans, business projections, spreadsheets, status reports, presentation slides, reports, videos, audio, mindmaps, lists, plain text, multimedia content, charts, graphics, graphs, timeline models, Gantt Charts, and project plans.

In various embodiments, the system comprises at least one computing device in communication with a remote server via a network, wherein the computing device comprises at least one database. The database is adapted to store the data pertaining to the management and prioritization of strategic objectives to users. The system also comprises sub-systems in communication with the remote server and the computing device. In various embodiments, the sub-systems may include a prioritization system; a tagging system; a management system; an analysis system; a calculation system; a front-end visualization system; a task assignment system; a collaboration system; a communication system; a data extraction system; an external interface system; a Scenario Projection system; and an ideation system.

In various embodiments, a method of identifying outcomes used in the prioritization system comprises contextualizing and filtering the scope of strategic objectives to achieve desired outcomes; calculating the numerical values associated with the relationships between the strategic objectives and their sub-objectives; and applying a sorting algorithm to the calculated values to assign prioritization of each task. The calculated values for each sub-objective and all associated tasks, and their corresponding priority are then stored in a database and a user may interact with the database entries through a variety of means, including but not limited to a graphical user interface or API to provide assign additional actions to each objective, such as ownership, timelines, and other information that may factor into future task prioritization, the selected strategic objectives are stored by the user in the database. The system then determines whether multiple objectives conflict in resource, priority, or some other metric of allocation, such as time. If they do conflict, then the system notifies the user of the conflict so that conflicting objectives may be resolved. If they do not conflict, then information is transmitted to the task assignment system for processing and assignment to employees.

In various embodiments, a method of using the prioritization system to calculate the numerical value through which one objective can be compared and ranked against all other possible objectives comprises the capturing of external stimulus experienced by an employee (such as a verbal request for a new feature by a customer); processing the stimulus into specific objectives, sequences, or actions; assigning the stages or steps required to accomplish the objective; analyzing the requirements needed to accomplish the objective in the manner required; determining the outcome following the achievement of the objective; contextually assigning impact and value relative to all other possible objectives; selecting the lens through which the objective in question and all other objectives should be compared; analyzing dependencies and other relationships between the objectives; generating a schematic for the interconnectedness and dependencies of the various objectives; calculating a priority value for a selected lens or metric based on the data in the schematic; prioritizing the objectives based on the selected lens or metric (such as revenue generated, dollars saved, time saved, market share increased); and outputting a master priority schematic with the order and sequence of objectives.

In various embodiments, a system for translating strategic objectives (tasks) into Workspaces for the development and ideation of intellectual property by directly linking the system required to manage and prioritize tasks with a system designed to facilitate the ideation of intellectual property through a common schematic. Such schematic would impact the existence, prioritization, and ordering of the Workspace within the ideation system.

In various embodiments, a system for establishing the value, timing, and tradeoff of providing resources to maintain and update an existing intellectual property instead of creating a new intellectual property through a system configured to analyze intellectual property development tasks and provide a contextualized valuation of the task and compare such task to tasks associated with updating existing intellectual property.

In various embodiments, a system for implementing an "assembly line" style job queue for the production of intellectual property and other work through a system configured to establish the ordering and priority of work such that the work can be placed into a job queue and the claiming of items in the queue can be done by employees or other users.

In various embodiments, a system and method for establishing course changing actions to reorient the prioritization or other metrics of objectives of the organization and sequentially adjusting downstream dependencies automatically. The system analyzes all possible tasks and their corresponding prioritization and through an algorithm, the scenario projection system creates a series of "what if" scenarios based on current and future priorities and actions taken within the organization and for how the work would be accomplished and allows the user to compare the outcomes of each scenario to define a best option. The best option can then be used as a guide to adjust the current state of actions and reorient the prioritization of the actions to match the best option over the course of a period of time.

In various embodiments, a system and method for translating an abstract assignment of an objective to a concrete Workspace where intellectual property can be developed for visualizing data about objectives and intellectual property in context, such as relationships, dependencies, and requirements in a digital virtual world such as in virtual reality or 3D.

In various embodiments, a system for tracking and analyzing human actions and stimulus to identify and optimize the prioritization of objectives by collecting information from sensors and data streams both in the physical and digital world, processing such information and analyzing the information for insights and data that can contribute to the contextualization and prioritization of tasks.

In various embodiments, a system for measuring and tracking the contributions made by each employee to the organization contextualized by objective priority and outcome value by allowing users in the system to claim certain work through a job queue, assignment, and management system. The system would create a closed loop where the employee or user would be able to be assigned the task, do all work within the system required to complete the task, and then complete and submit the deliverable at the appropriate destination and all statuses and process along the way would be tracked by the system and made part of the user's unique individual record for performance evaluation and accommodation among other uses.

In various embodiments, a system for calculating the value of task dependencies and impact across the organization by utilizing a system and algorithm designed to analyze, correlate, and contextualize relationships between various tasks within the system through keywords, tags, and other metadata. The system would utilize this information in conjunction with a scenario projection system to analyze the impact of prioritizing one task over another task in the context of the "bigger picture" whereby dependencies for a given task may impact prioritization and impact to the organization.

In various embodiments, a system and method for calculating and valuing the scheduling of tasks to optimize outcome value.

In various embodiments, a system and method for contextually escalating or delegating the prioritization and value of tasks to those within the relevant team for facilitating process optimization such as contextually comparing various metrics to identify discrepancies or misalignment in allocations and projections through an analysis system, a calculation system, and a front-end visualization system.

In various embodiments, a system for mapping real-world events and market feedback to objectives (active, planned, and completed) within the system to contextually adjust future calculations through the use of an external interface system configured to collect data from external sources and apply such external data to the calculation system's algorithms as a weight to the prioritization or other similar variable.

In various embodiments, a system for aligning employee actions and contributions with the overall objectives of the organization through the utilization of a job queue where users would be automatically provided a list of options for work that could be selected from and claimed. Through the Management system and the prioritization system the work provided in the job queue would be configured to align to the organization's objectives through an adaptive algorithm.

In various embodiments, a system for dynamically reallocating resources in real-time as external forces impact organizational operations and alerting users to such changes for timely response by utilizing external data and user input captured within the tool and a calculation system configured to account for such fluctuations and re-calculate the prioritization and other key metrics of tasks in a real-time, near real-time, or other time interval bases depending on how the system is configured by the users. The recalculations from the calculation system would send updated information to the prioritization system where the resources of the organization could be reprioritized as needed.

In various embodiments, a system for using historical data to inform the value and prioritization of new objectives through a learning algorithm utilizing an analysis system and tagging system whereby existing data within the system is analyzed and associations are made to new possible data that may enter the system and such data may be classified based on the historical data.

In various embodiments, a system for providing higher performing employees with more critical assignments through an evolving and learning assignment algorithm whereby the analysis and prioritization systems would interface with the management system and communicate with other internal or external systems associated with determining employee performance metrics, such performance metrics would be mapped back to specific tasks within the management system and analyzed to establish a positive or negative contribution which would impact the tasks that appear in one user's job queue versus another user's job queue.

In various embodiments, a system for analyzing objectives and contextually providing relevant information and data to aid in the completion of the objective by analyzing the metadata associated with the objective and developing a schematic for related information that may also match a similar metadata footprint. The system may then interact with other internal or external systems to gather other data that has a similar footprint to the data in question and present such similar data to the user in the appropriate context.

In various embodiments, a system for managing hybrid-hierarchical and networked data structures that enables employees and stakeholders to allocate cross-departmental resources to the achievement of a single objective through a management system that allows for tasks to be mirrored across various parts of a hierarchy while also allowing the data within each section of the hierarchy to be unique. The management system would optionally be able to roll-up various parts of the data across multiple sections of the hierarchy as the user's discretion to synthesize a networked collection of data that inherits its metadata and attributes from multiple sources in a calculated and proportionate way based on the proximity and context of the related hierarchical sections.

Some aspects include a process including receiving, by a computer system, a plurality of tasks; assigning, by the computer system, a context tag to each of the plurality of tasks based on a comparison between the plurality of tasks and existing tasks stored in a database; filtering, by the computer system, the plurality of tasks based on the context tag assigned to each of the plurality of tasks; calculating, by the computer system and for each of the plurality of tasks, task values associated with relationships between each of the plurality of tasks and any sub-tasks corresponding to each of the plurality of tasks; sorting, by the computer system, the task values and assigning prioritization to each of the plurality of tasks; and storing, by the computer system, the task values and the prioritization assigned to each of the plurality of tasks in the database.

Some aspects include a tangible, non-transitory, machine-readable medium storing instructions that when executed by a data processing apparatus because the data processing apparatus to perform operations including the above-mentioned processes.

Some aspects include a system, including: one or more processors; and a memory storing instructions that when executed by the processors because the processes to effectuate operations of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements:

FIG. 2 illustrates a sequence schematic in accordance with one or more embodiments;

Figure 1:
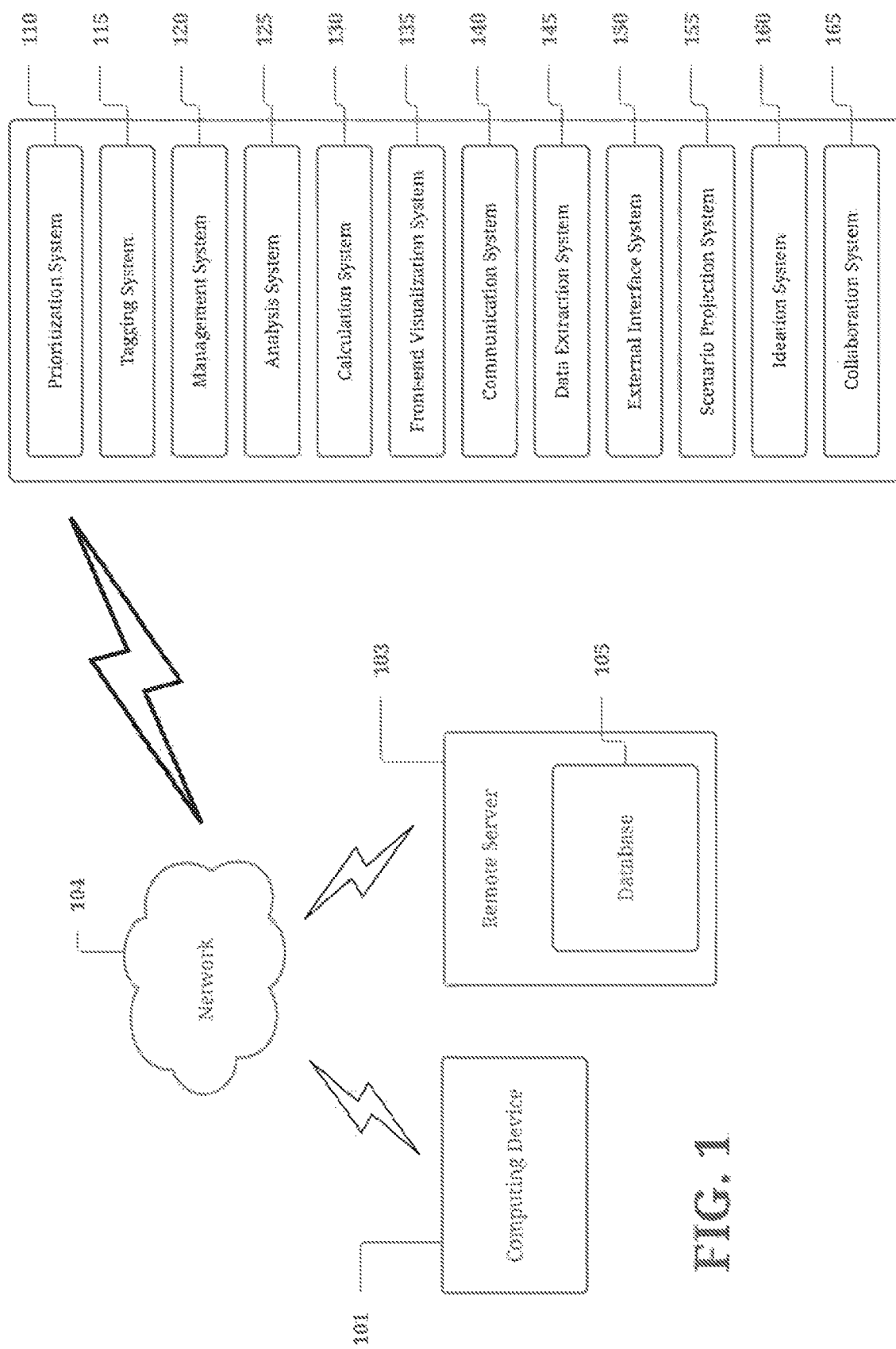
FIG. 1 illustrates system for contextually assigning priority, value, and ownership to an organization's strategic objectives, actions, outcomes, and other key decisions, in accordance with one or more embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF EXAMPLE EMBODIMENTS

To mitigate the problems described herein, the inventors had to both invent solutions and, in some cases just as importantly, recognize problems overlooked (or not yet foreseen) by others in the fields of task management, data processing, and data systems. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Examples of the generalized assignment problem arise in the context of allocating resources in an organization, a use case discussed below to illustrate the present techniques, but it should be emphasized that the approaches may also be used to assign computing workloads in a compute cluster, allocate workflow among process equipment in an industrial manufacturing process (e.g., assigning substrate patterning steps to photolithography equipment in a semiconductor manufacturing process, or assigning workpieces to CNC (computer numerical control) milling equipment in a machining shop), among other non-organizational use cases.

Current computer-implemented task management systems exist but generally fail to effectively align organizational priorities and provide valuable context to clearly define the order in which tasks should be completed to achieve organizational objectives. Specifically, existing systems generally fail to account for the permutations of options that result from the highly complex interconnectedness of departments and projects/programs that exist within an organization and effectively establish a sequence of priority. Thus, existing systems are computationally expensive when scaling to manage and prioritize many tasks based on many organizational objectives. These various dimensions may combine to form a relatively high dimensional, extremely large, universe of potential task priorities that may be submitted in a query to the task management application, in some cases exceeding more than 100 million, more than 500 million, more than 1 billion, more than 100 billion, or more than 1 trillion different tasks to which the task management application is configured to respond with a task prioritization for the corresponding organizational objective or objectives. For example, an organization that has 10 strategic objectives at each level of management and an average of seven to ten common levels of management (CEO, SVP, VP, Director, etc.); accordingly, such organization would have between $10^7$ and $10^{10}$ tasks as required actions and (n!) permutations as possible options for sequencing the completion of such actions. With numerous other variables that constantly change and evolve over time due to external forces (for example market forces), such complexity results in an "NP-Hard" problem making an existing systems approach to ordering and prioritizing tasks at scale that exceeds computational feasibility. As a result, systematically evaluating every task comprehensively throughout the space is prohibitive in cost, time, and computing resources in many use cases. Further, randomly sampling within this space across all dimensions can be relatively inefficient, in some cases, consuming excessive computing resources and memory to adequately characterize a response surface in terms of task management application in this parameter space.

Another issue with existing systems of priority and task management is the inability to effectively maintain a constantly updated realtime or near-realtime "state of the world" which accurately represents the current state of all active, in progress, and completed tasks and their interconnected impact on the organization as a whole. The "Butterfly Effect" concept which postures that a small change or action can create a ripple effect with massive down-stream consequences can be applied to the importance and significance of impact for tasks in an organization. Because even small tasks can have a significant impact on an organization due to dependencies, interconnectedness, or bottle-neck factors, there exists a need for a system which can account for the impact such tasks can have on the system as a whole, and display such impact on a massive data set in a realtime or near-realtime fashion to give users a view into the most accurate "state of the world" possible for a given organization.

Further, existing systems of priority and task management also generally fail to provide a scalable and flexible method for human-computer interaction where a human can easily input new key defining data or update existing data about a set of tasks or subset of tasks that can facilitate the calculation of a granular and specific sequencing of tasks. Further, existing systems generally fail to enable intelligent and proportionate programmatic propagation of data and values across a network based on the relationships of tasks in the network and instead require humans to manually maintain tasks and input modifications to such variables. As such these existing systems cannot scale to be commercially viable beyond a few hundred entries due to the limitations in human cognition for maintaining a cohesive group of information and relationships between bodies of knowledge (Dunbar's Number, Bernard-Killworth number—where tasks/projects/programs and the foundational knowledge required to work on such activities functions much like the relationships between people in requiring memory and background knowledge to have a meaningful interaction).

Additionally, existing systems of priority and task management also generally fail to account for the dependencies and requirements that impact the completion of certain tasks because the preceding requirements have yet to be completed. The result is many disjointed projects, programs, or teams of people who end up running into roadblocks and artificial limitations on productivity because different parts of the organization are not moving in sync. The failure of multiple organizational units/teams/groups not operating in sync causes duplicate work, delays in work, significant reductions in productivity, and much wasted time, resources, and money.

In some existing task management systems, the databases responsible for transmitting the data throughout the systems are simply not adapted to account for the highly detailed factors or data models required to accurately assign priority and manage the interconnected dependencies required for an optimal task management and priority assignment system. The result of the architecture deficiency is the creation of an employee task queue (or task list) and management structure with hundreds or thousands of tasks that are all marked as "high priority" with no further distinction. Specifically, this approach becomes unintelligible, overwhelming, or too large to comprehend, with no clarity being provided to the employees as to what task (or tasks) is truly most important to work on first out of the ones marked "high priority". That said, none of the discussion of deficiencies in existing systems should be read as a disclaimer of claim scope.

Accordingly, there exists a need for a system for efficiently and consistently contextually assigning priority, value, and ownership to an organization's strategic objectives, actions, outcomes, and other key decisions. The system should generate coherent, meaningful, precise, and logical sequences of actions to accomplish strategic objectives that account for the various interconnected dependencies and requirements within the organization to result in full compliance with the relevant policies, rules, regulations, and laws of the user. Approaches described below may at least partially address, and in some cases fully address, some or all of these needs. Some embodiments contextually assign priority, value, and ownership to an organization's strategic objectives, actions, outcomes, and other key decisions. As noted above, this assignment problem is known to be NP-hard, but embodiments may render solutions more computationally feasible with commercially reasonable amounts of computing resources through an improvement in human-computer interaction and a computation approach that results in a computationally feasible set of possible sequences and outcomes at commercially relevant scales.

For example, instead of calculating the (for practical purposes) near infinite permutations of the NP-Hard problem (n!) where "n" could equal or exceed $10^{10}$ to select the proper sequencing of tasks, through a combination of capturing key human input (such as cost, value, timeline, interest, and other external factors) and aided by a set of computer algorithms, some embodiments may produce a finite, manageable set of—for example—ten favorable outcomes that could be reviewed and selected by a human. Some embodiments allow for users to provide input to the system to reduce the number of possible permutations by offering users a scalable and flexible way to account for the near endless number of possible variables and parameters that can affect any set of tasks.

Depending on how the system is configured by the organization the improvements in human-computer interaction, user interface, and evaluation of data to derive specific values for prioritization, the system may be configured to solve (or mitigate) challenges that exist today in combinatorial optimization and, in particular, address use cases involving the generalized assignment problem, which pose complex challenges for organizations across industries, as well as when assigning computing tasks to resources in a compute cluster or data center, and when assignment manufacturing process steps to milling equipment, for example.

In some embodiments, the sequencing of strategic objectives built using the system is created by identifying the various strategic objectives the organization through both user input and computer data analysis. The sequencing of strategic objectives and related outputs may be expressed in any type of form, such as an ordered list, a series of instructions, text, videos, images, audio, virtual reality, etc. An example of such strategic objective sequence may be a company's goal to "Increase productivity by 5% within the next calendar year" and the accompanying to-do list required to achieve such objective. In some embodiments, these sequences are known as tasks.

In some embodiments, the system is able to scale the ability for a human to manage a collection of tasks by providing a new method of human-computer interaction where the human is able to re-define, update, or add new tasks to the overall system in a way that allows for the intelligent, programmatic, and proportionate allocation of values and changes in values across a near-infinite set of tasks through the use of a hybrid-hierarchical and network system that can be manipulated via a dynamic user interface. The user interface also eliminates the human cognitive limitations for maintaining complex group information by altering the form in which task data is presented through a calculation that determines the unique context the data that is being accessed to facilitate, the outputs that are desired by the human, and the position of the task in question relative to the whole network or some subset thereof.

To create and identify the sequencing of tasks, in some embodiments, the system first collects the list of all possible tasks through a combination of user input and externally captured data analysis. The system will then assign a value to each task through the relationship between all other tasks in the system and additional user input. The system then breaks down the tasks by metric, such as the value, and then identifies and aggregates all duplicate tasks to create a list of all possible tasks. For example, if the task for "File Patent XYZ-3" is found on an engineering team's task list and the legal team's task list, it is deemed to be the same objective in both locations. The system disclosed herein would then aggregate all duplicates of that objective to leave a single object, which may translate to a "File Patent XYZ-3 Task" and adjust the values accordingly.

Once lists of each user's tasks are created, in some embodiments, the system cross-references the lists between users to create a contextual Network Map Schematic for the relationship between the tasks before aggregation, then the contextual Network Map Schematic of all tasks is consolidated, and duplicates are aggregated. The result in some embodiments, is only one copy of each unique task for the organization as well as a detailed contextual Network Map Schematic of how each task is interconnected with all other tasks.

Using a combination of each task's numerical values for any lenses applied to the task (such as Priority, Cost Savings, Growth Potential, ROI, Financial Impact, or Potential to Generate Revenue) and the contextual Network Map Schematic of how each task relates to all other tasks that exist in the system, in some embodiments, the system can then calculate the relative value of each task in relation to all other tasks that exist in the system and assign a quantifiable and specific numerical value to each task in the system. For example, Task 1 may have a calculated value of 0.1, Task 2 may have a calculated value of 0.05, and Task 3 may have a calculated value of 0.075.

The calculated values for each task are not static in some cases and may change in real-time as the data that is used to calculate each value is changed, for example if the market forces change the ROI for Task 2 to move more in favor of an outcome that benefits from Task 2, then the calculated value for Task 2 may increase from 0.05 to 0.08. At the same time the same market forces that favorable effected Task 2 may have a negative impact on Task 3 and Task 3's calculated value may decrease from 0.075 to 0.045.

In some embodiments, the sum of all calculated values equals 100% of the total metric being used to evaluate the equation. For example, in some use cases, an organization's human resources allocation can never exceed 100% of their available time or resources because it would be impossible to have 110% of available resources. In the event 110% of resources are required to accomplish all tasks, then to comply with the system's parameters, 10% additional resources would need to be added (i.e., people hired) so the new total capacity of organization is now 110% of the original capacity and that new capacity will represent the then current capacity requirements while also being at 100% current capacity.

The system may then calculate values for each task that is to be prioritized and order each of the tasks based on a chosen configuration, for example highest value tasks first, or lowest value tasks first. The sequence output of the ordering system in some embodiments, becomes the Sequence Schematic for task prioritization where the first task in the sequence should be completed first, and the final task in the sequence should be completed last. The ordering system may compute the ordering and sequence of tasks in real-time (e.g., within less than 500 ms, 5 seconds, or 5 minutes of receiving updated inputs), near real-time, or at a user specified time interval based on the user's configuration of the system. When the sequence is recalculated, if the values and ordering of the tasks changes, the system may update the Sequence Schematic accordingly.

In some examples, the Sequence Schematic may be used to present the sequenced task list to the end-users who can claim a specific task for their work and begin working on the task. In some examples, a manager may use the task Sequence Schematic to assign specific tasks to specific employees.

In addition to providing a sequence for ordering tasks and claiming or assigning tasks to specific people, some embodiments may utilize the structure of the Sequence Schematic to programmatically generate specially tailored digital workspaces and data repositories through which the ideation and processing of abstract thought could be translated into concrete ideas and intellectual property that would facilitate the accomplishment and completion of the assigned tasks. In some embodiments, the workspace may be called a "Workspace". Each task would have a dedicated digital Workspace and would be presented to the user based on the configuration outlined in the task Sequence Schematic.

In some embodiments, the digital Workspace may capture text-based notes, multimedia materials such as images and charts, or function as a repository for other digital files such as video clips, audio, slide decks, spreadsheets, etc. The digital Workspace in some embodiments, may also be able to utilize the task Sequence Schematic and metadata associated with the task to provide a source for related relevant materials that exist elsewhere in the system (or in external systems or data repositories) that would facilitate the completion of the task. For example, if the primary task is to "Rewrite and update the company mission statement," then the system may create a digital Workspace which contains the then current version of the mission statement, as well as other related pieces of corporate materials such as the company's vision statement, recruiting messages, or summary of company culture in all available media formats. The Workspace in some embodiments, may also allow the user to contribute new ideas for possible versions or variations of the mission statement in a "raw" or "unpolished" form which could be used as brainstorming notes that could later be developed by the user to create a final new version of the company mission statement.

FIG. 1 depicts a system diagram, including a system 100 (e.g., a resource and task management system), for efficiently and contextually assigning priority, value, and ownership to an organization's strategic objectives, actions, outcomes, and other key decisions. System 100 may include at least one computing device 101, a server 103, and at least one database 105, communicatively coupled to each other via a network 104. The server 103 may be part of a network-based system. For example, the network-based system may include a cloud-based server system. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data. It should be noted that, while one or more operations are described herein as being performed by particular components of system 100, those operations may, in some embodiments, be performed by other components of system 100. As an example, while one or more operations are described herein as being performed by components of computing device 101, those operations may, in some embodiments, be performed by components of server 103. System 100 may also implement one or more machine learning model(s), which may be implemented on computing device 101 and server 103, or accessible by network 104. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

The computing device 101 may be a mobile device, a server, a tablet, a desktop, or a laptop computer. The computing device 101 is operable to perform the steps or otherwise provide the functionality discussed herein. In some embodiments, the system may be known as Nebulous™.

The strategic objectives and other metrics utilized within the system and output by the system may be in any form, such as, but not limited to (which is not to suggest that other lists are limiting) priority lists, tasks, financial models, resource availability calculations, human capital allocations (people), annual plans, business projections, spreadsheets, status reports, presentation slides, reports, videos, audio, mindmaps, lists, plain text, multimedia content, charts, graphics, graphs, timeline models, Gantt Charts, and project plans. The strategic objectives and other metrics may be used as inputs and/or included in training data sets or test datasets in order to train or refine the machine learning model(s). In some embodiments, output(s) of the machine learning models may be fed back to machine learning model(s) as input to train machine learning model(s) (e.g., alone or in conjunction with user indications of the accuracy of outputs, labels associated with the inputs, or with other reference feedback information). In another embodiment, the machine learning model(s) may update its configurations (e.g., weights, biases, or other parameters) based on the assessment of its prediction (e.g., output(s)) and reference feedback information (e.g., user indication of accuracy, reference labels, or other information). In another embodiment, where the machine learning model(s) may include a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model(s) (a format which should not be read to suggest other terms are limited to the singular where "(s)" is not used) may be trained to generate better predictions (e.g., as measured by F2 score).

The server 103, in some embodiments, is adapted for remote communication with the computing device 101. The server 103 may also be adapted for calculating values, evaluating algorithms, processing data, extracting tasks from data, building schematics and sequences of tasks, mapping and determining dependencies of tasks, process conversations and real time events, process digital exchanges such as email or instant messaging channels, and display information to a user. The server 103 may be adapted to process other forms of human interaction such as conversations and non-verbal actions, or to display visualizations such as virtual reality, augmented reality, 3-D, modeling data, and holograms.

The at least one database 105, in some embodiments, is adapted to store the data pertaining to the contextually assigning priority, value, and ownership to an organization's strategic objectives to users. The system 100 may also comprise one or more database backup systems or memory adapted to store a backup of the data. Memory may be any type of local, remote, auxiliary, flash, cloud, or other memory known in the art. Only non-transitory computer readable storage media is intended within the scope and spirit of the claimed subject matter.

The system 100, in some embodiments, also comprises a prioritization system 110 that is adapted to execute the machine learning-based and artificial intelligence-based algorithms to prioritize and order task to generate a Sequence Schematic by the system 100. As such, the prioritization system 110 may implement supervised, semisupervised, or unsupervised machine learning algorithms, and may be further trained by such that it can predict strategy, emotional drivers associated with one or more users, urgency factors, and other traits impact the prioritization of tasks. The result may be the creation of a more optimized ordering of tasks in the system. The prioritization system 110 may also be able to guide and facilitate the user's prioritization of new tasks as they are added to the system. The prioritization system 110 may output a contextualized Sequence Schematic which can be utilized by other parts of the system 100, and in some embodiments may be formatted as shown in FIG. 2.

Figure 8:
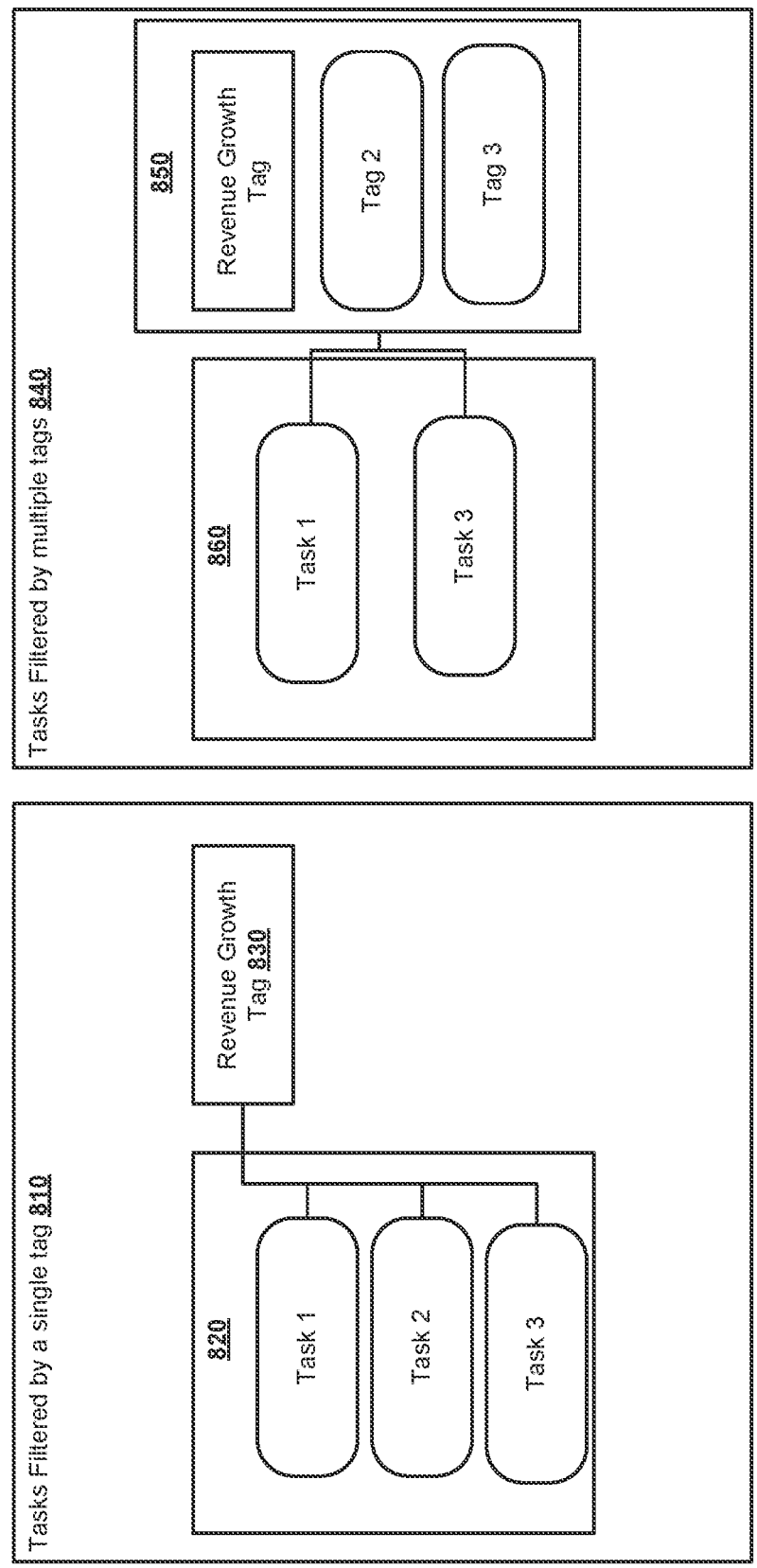
FIG. 8 illustrates a flow chart of an exemplary process for generating metadata for task, in accordance with one or more embodiments.

The system 100, in some embodiments, further comprises a tagging system 115 adapted for tagging all tasks in the system 100 with relevant information. As used herein, a "tag" refers to a piece of data or metadata that determines the category, classification, value, impact, timeline, relationship, order, and prioritization between tasks. For example, a task with a tag that equals "Revenue Growth" could be sorted and filters to present to the user with all other tasks that contain Revenue Growth as a tag, or other tags similarly related to Revenue Growth, as shown in FIG. 8. The tasks tags may be calculated and derived using an analysis system 125 found in the system 100. The tagged tasks may also be filtered, interacted with, reduced, and aggregated based on the tags using a front-end visualization system 135 found in the system 100.

Figure 9:
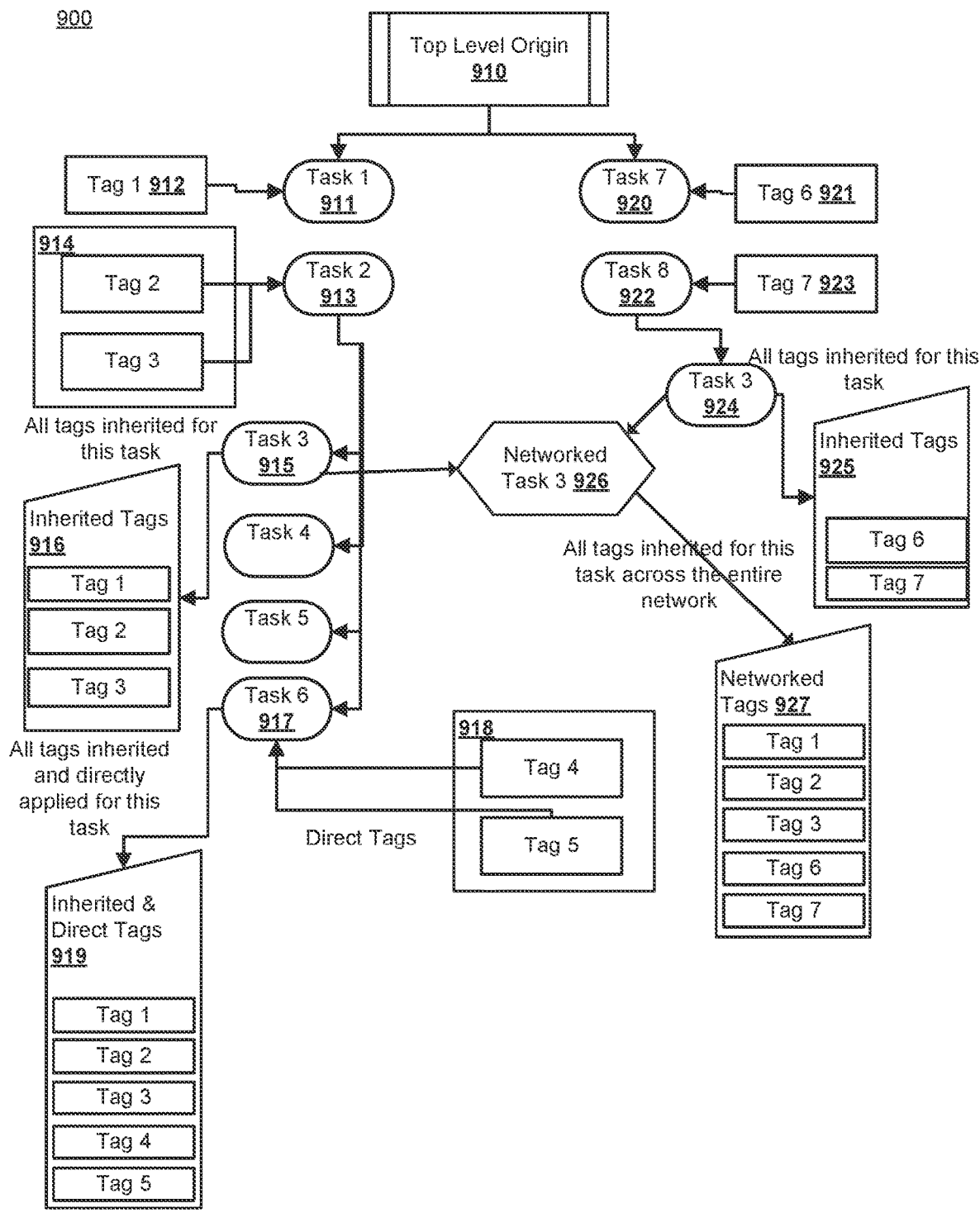
FIG. 9 illustrates a flow chart of an exemplary process flow through which metadata can is inherited by subtasks or networked tasks, relative to their relationships between the tasks, in accordance with one or more embodiments.

In some embodiments, the tags applied to the tasks in the system may inherit the hierarchical or networked relationships between the various tasks within the system. For example, as shown in FIG. 9 the tags applied to the task are inherited by the subtasks in the hierarchy. In FIG. 9, the tags applied to the task are also inherited, in some embodiments, and passed along to additional occurrences elsewhere in the system due to the task occurring under multiple different strategic objectives.

In some examples, the tags ensure that only data that are relevant to the user's specific outcome or task at hand will be presented to the user within the ideation system 160 found in the system 100.

There is, in some embodiments, no limit on the amount of these tags that may be associated with each task in the system 100. However, there is a limit as to number of relevant tags that can logically be associated with each task to properly describe and contextualize the task in the system. For example, Task XYZ would have preconfigured associations with all higher-level tasks, such as Task 123 and Task 987, that are dependent on Task XYZ being completed before work can begin (a dependency). In this example, Task 123 requires Task XYZ to be completed before it can begin and therefore Task 123 may be tagged to "Require Completion of Task XYZ" before Task 123 can be place in the Sequence Schematic to enter the queue to be assigned to an employee.

In some examples, tags for the tasks in the system 100 are preconfigured associations between multiple tasks such that tasks can be categorized in a way that is logical and readily understood. Each of the tasks in the system 100 may be pre-configured with the tags to contain all relevant task linkage opportunities. There is no limit to the number of tags each task in the system 100 can contain. However, the tags, in some embodiments, help ensure that a task is logically associated with another task to further the creation of a Network Map Schematic in the system 100. For example, when multiple tasks are tagged with "Revenue Growth" as a tag, all of the tasks with that tag may be related in some form, and these relationships are utilized as a component of the basis for a Network Map Schematic to be created.

In some examples, tags use the prioritization system 110 to analyze the combination of multiple tasks into sequences in the system to ensure the proper sequencing and order of the tasks. Examples include ensuring that a task that has a dependency does not precede the dependency (rendering the task incompletable until the dependency is completed).

The system 100, in some embodiments, further comprises a management system 120 adapted for managing and executing user input, review, and approval of tasks and date input into the system 100 as well as other operational authorizations such as user access permissions. The management system 120 operates in conjunction with the front-end visualization system 135 that produces data and information visualizations that facilitate the user's interaction with the system 100 to input the required data.

The system 100, in some embodiments, further comprises the analysis system 125 adapted for executing machine learning-based and artificial intelligence-based processes of the system in conjunction with the prioritization system 110. The analysis system 125, in some embodiments, is configured to utilize both the data and Sequence Schematics generated by the prioritization system 110 as well as data from other sources such as other internal or external systems that have been processed and ingested by the external interface system 150 (to include a Customer Relationship Management System, a Financial System, an Enterprise Resource Planning System, a Supply Chain Management system). The analysis system 125 uses these various data streams to associate and analyze the relationships between instructions and Sequence Schematics generated by the prioritization system 110 and compares and analyzes the real-world impact of the organization prioritizing such actions. The analysis system 125, in some embodiments, then uses the data generated by the analysis to inform future weighting of algorithm variables or constants in the prioritization system 110 and other subsystems within the system 100.

In some embodiments, the system 100 contains a calculation system 130 adapted for calculating and evaluating various mathematical equations. In some embodiments the calculation system 130 will compute the values utilized by the prioritization system 110 such as the "Objective Value Algorithm" that contains parameters such as the base value of a selected task (X), the networked value of the position of the tasks in relation to all other tasks in the network (N), and numerical value produced by the product of all the metadata and tag based modifiers associated with the selected task ($\Omega$) to calculate the final task value (V) as shown in Table 1. In some embodiments, the algorithm may utilize an exponential modifier of the X, N, or $\Omega$ values to facilitate an additional weighting on the given variable based on the specific requirements and configuration of the organization and their valuation needs. Additionally, the organization configuring the system may opt to remove the absolute value step as part of the equation.

TABLE 1 for Objective Value Algorithm

| $\|X \cdot N \cdot \Omega\| = V$ |
| --- |

The output value V from the calculation system 130, along with the corresponding task is then transmitted to the prioritization system 110 where it can be evaluated and placed in the proper position within the Sequence Schematic. In some embodiments, the system may additionally factor in a weighting system within the N variable when the localized values provided to the system are incomplete with missing data or terminal. Such system may expand the scope of the N variable calculation to account for the next tier (level) of related tasks and apply a set of logical rules, where if the outcome is true, then the additional weight is calculated, and if the outcome is false, the additional weight is not calculated. Such logic may involve counting the number of tasks in the next level of the network, determining the positioning of those higher-level tasks, comparing the relationships between the primary task being evaluated and the higher-level tasks, viewing the status of terminal tasks within the tasks in question and higher-level tasks, evaluating the hierarchy of tasks within the system and compare such hierarchical positioning to the network relationships derived, or some combination thereof. In other embodiments the system may also group tasks together for the sake of calculation or for completion and user input. Such grouping may or may not impact the weighting on calculating the N variable depending on the organization's configuration and requirements.

In some embodiments, the System 100 utilizes a front-end visualization system 135 to display the various visual components of the software to the user in a variety of mediums, depending on what configuration is required by the user and the best method for displaying the data, these illustration methods may include two-dimensional visualization on a computer screen, in 3D, or in a virtual reality, augmented reality, or hologram formats.

Yet further, the system 100, in some embodiments, comprises a communication system 140 adapted to deliver messaging and notifications of events that occur within the system to the user based on the user's notification configuration. Some examples of the medium of delivery include, but are not limited to a text message, smartphone Push Notification, an email, an instant message, a calendar event, an API event that triggers an event in an external application, video file, a written document, an audio file, a video game/entertainment device, or other functionally equivalent format. The method for delivery of a notification through a medium, in some embodiments, depends on the user's configured notification settings and the context of the task triggering the notification event. For example, if a number of tasks are reprioritized by the prioritization system 110 then the user may receive a notification that "Your tasks have been reprioritized" by the Communication system 140. The Communication system 140, in some embodiments, may also interface with other external systems to identify the best form of communication and deliver a message in the best media format as determined by the tagging system 115 and the analysis system 125 working in conjunction.

In some embodiments, the system 100, may also contain a Data Extraction system 145 adapted to ingest all forms of media and external stimulus to extract data, information, content, knowledge, tags, triggers, intellectual property, and tasks that may be present in the stimulus. The Data Extraction system 145, in some embodiments, may use capabilities such as text analysis, voice recognition of spoken keywords, or other forms of data extraction within stimuli such as a business meeting, email, text message exchange, person to person conversation, video conference, or other forms of media such as text documents, slide decks, audio messages, podcasts, and videos to extract the applicable data to be used elsewhere in the system 100. The Data Extraction system 145, in some embodiments, may use a formula such as the one outlined in Table 2 to extract processed data from raw data. In some embodiments this process may be known as Chunking. In some embodiments, the calculation system 130 will compute the values utilized by the Data Extraction system 145 such as a "Chunking Algorithm" that contains parameters such as the base value of a current state value of the chunk (X), the sum of all modifier factors (V), and require such output to be greater than the cutoff threshold (Z) for the instruction to be considered true. In some embodiments, the formula when evaluated must present an output where value, when the greater than the cutoff threshold (Z), results in an output that is considered false. In other embodiments the Chunking Algorithm may not use a current state value at all and instead simply rely on the sum of all modifier factors to evaluate the expression. Additionally, the algorithm may apply an absolute value or exponent to the algorithm before comparing the output value to that of the cut-off threshold Z.

TABLE 2 for Chunking Algorithm $X - \Sigma v_a > Z$

The system 100, in some embodiments, also comprises an external interface system 150 which is adapted to facilitate the transmission of data into the system 100 and data out from the system 100 to external applications via an API or similar interface. For example, the external interface system 150 may facilitate operations by the system 100 to interact with external data sources such as other applications used by the organization, or stream data from the system 100 to a third-party application where it can be used to inform other external systems decisions.

The system 100, in some embodiments, further comprises a scenario projection system 155, which is adapted to apply a time-based scenario model whereby permutations of decisions and prioritization actions can be mapped, scripted, and analyzed, to evaluate the various outcomes that may be achieved by prioritizing one set of actions over another. The scenario projection system 155, in some embodiments, would be equipped to evaluate numerous scenarios, generate Scenario Projection Schematics, and compare the results to enable the user to select the best possible outcome. The scenario projection system 155 may also interface with the prioritization system 110, tagging system 115, analysis system 125, and the calculation system 130, to utilize the optimal projections created by the scenario projection system 155 and adjust the sequencing of tasks and other algorithms utilized by the systems. The scenario projection system 155 may also interface with the front-end visualization system 135 to present various scenarios to the user and compare the outcomes and metrics of each scenario in a visual manner. The scenario projection system 155 may also interface with the calculation system 130 to present various scenarios to the user and compare the outcomes and metrics of each scenario in a numerical manner.

In some embodiments, the system 100 contains an ideation system 160 adapted to manage and facilitate the process of translating abstract ideas invented by users into concrete tangible intellectual property. The ideation system 160, in some embodiments, connects to the management system 120 and the prioritization system 110 to automatically create new Workspaces pre-configured for the user's ideation process using a combination of configuration settings and the Sequence Schematic and Network Map Schematics created by other parts of the system 100. As new Sequence Schematics are generated by the prioritization system 110 and the Network Map Schematics are generated by the management system 120, in some embodiments, the ideation system 160 receives the data and generates Workspace database object to capture key information and data associated with each specific task outlined in the Sequence Schematic. The data, in some embodiments, can be captured and categorized automatically within the Workspace using a combination of the external interface system 150 for data ingestion, the Data Extraction System 145 for extracting relevant data from the raw data, and the analysis system 125 and tagging system 115 for processing and categorizing the extracted data and placing it into the right Workspace within the ideation system 160. The ideation system 160, in some embodiments, is configured to accept all forms of data as each task may require various mediums and media formats for the ideation process. The Workspace for each task within the ideation system 160, in some embodiments, is accessible by authorized users as determined by the permission and access management portions of the management system 120. The ideation system 160 may also categorize and add tags to the Workspace based on the data within the Workspace. The data captured within the ideation system 160 may be sent to an external system using the external interface system 150 where it can be processed from brainstorm style data into coherent and polished intellectual property for use within the organization.

The ideation system 160 may also utilize the prioritization system 110 Sequence Schematics to establish the order by which the Workspaces in the ideation system 160 are presented to the user through the front-end visualization system 135. As the Sequence Schematics are updated and changed by the prioritization system 110, in some embodiments, so would the ordering through which the front-end visualization system 135 displays the Workspaces to the user.

The system 100, in some embodiments, also comprises a collaboration system 165 adapted for facilitating the interaction of humans to collaborate and ideate through the sharing of information, content, knowledge, data, and other intellectual property. Some tags in the system 100 may be used to designate a task as being part of one digital Workspace or another within the ideation system 160. Other tags may determine the confidentiality or access level required to access and view the specific task or sub-tasks across the system 100. The collaboration system 165, in some embodiments, allows the system to manage the flow of specific information between digital Workspaces within the ideation system 160 and between internal and external users through the external interface system 150. The result is that each task may have the maximum allowed opportunity for collaboration within the system 100 while also enabling complete security within the organization, allowing user information to be kept safe and protected when needed, while delivering benefit to external parties such as partners and resellers, when applicable.

In some examples, five schematic files are created throughout the system 100. The first schematic is the Processed Task Schematic and is generated by the system 100 as new tasks are added. This schematic is used as a reference file for the next steps of the process since it comprises the base structure and data of the task. In some embodiments, this schematic is known as the Processed Task Schematic.

In some examples, the Network Map Schematic is created next and contains information about the interconnected relationships between various tasks within the system 100 as well as the corresponding strength and value for each relationship and other relevant metadata. In some embodiments, this schematic is known as the Network Map Schematic.

The Processed Task Schematic and the Network Map Schematic, in some embodiments, are processed together in the system 100 to create the Related Task and Similarity Schematic. The Related Task and Similarity Schematic can be utilized by the system 100 to approximate and calculate possible values for tasks and inform decisions and scenario projections within the system in real-time or near real-time depending on configuration. In some embodiments, this schematic is known as the Related Task and Similarity Schematic.

The Sequence Schematic, in some embodiments, is generated by the prioritization system 110 within the system 100 utilizing the other schematics made available within the system 100 as well as optional external data sources such as user input.

The Scenario Projection Schematic, in some embodiments, utilizes information provided by the other schematics as proceeded by the scenario projection system 155 to capture possible outcomes that may result from their choice to prioritize or allocate resources to one set of tasks versus another, or completely add or remove selected tasks. The Scenario Projection Schematic, in some embodiments, could be loaded into the front-end visualization system 135 to present the data in a consumable form to a user. In some embodiments, this schematic is known as the Scenario Projection Schematic.

In other embodiments, there may be less than five or greater than five schematics and the order of the schematics in the system may vary.

The schematics outlined above comprise information and data about the tasks contained within the management system 120. This information and data may be used by the ideation system 160. This data and information corresponding to the schematics may be contained within an XML file, JSON file, or any other type of data file. The final file format for housing the temporary data will depend on which file format best integrates the code of the system 100.

FIG. 2 illustrates a Sequence Schematic in accordance with one or more embodiments. In various embodiments, the sequence schematic may be generated by the prioritization system 110 and according to the process discussed above. For example, prioritization system 110 may generate a Sequence Schematic (i.e., a sequence output) based on values calculated for each task that is to be prioritized and the order that each of the tasks is to be performed based on a chosen configuration. As illustrated in FIG. 2, the tasks 1, 2, 3, 4, and 5 may be prioritized based on the highest calculated value.

Figure 3:
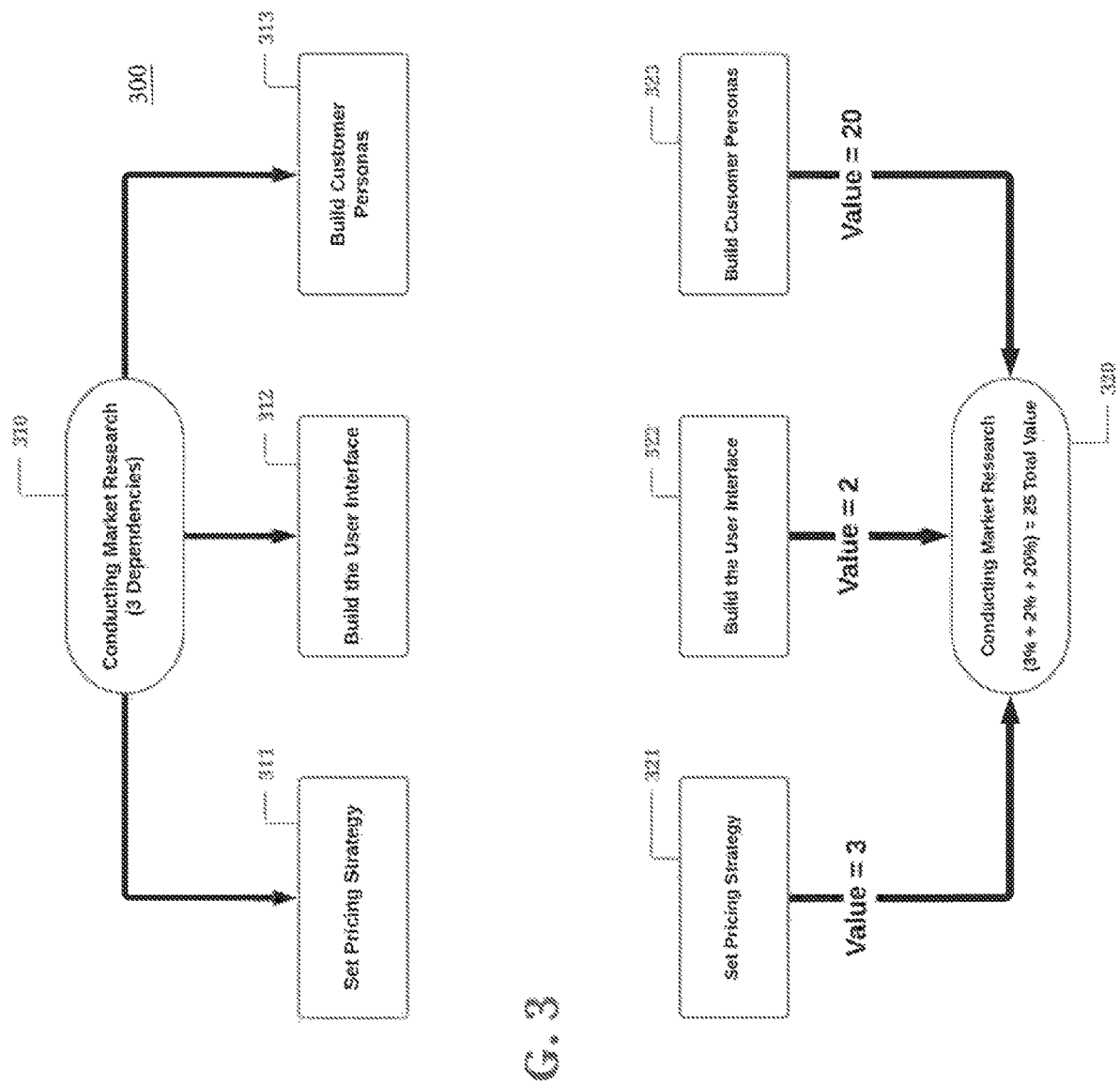
FIG. 3 illustrates a flow chart of an exemplary process for calculating the value of a task based on the subtasks that make up that task, in accordance with one or more embodiments.

FIG. 3 shows a flow chart illustrating an example method 300 of calculating the value of a task based on the subtasks that make up that task used in the calculation system 130. The process starts with the primary task at step 310. The sub-tasks for step 310 are derived as 311, 312, and 313. Each subtask has a value associated with it that was calculated by the calculation system 130.

At step 320, for example, with a first value 321 of 3, a second value 322 of 2, and a third value 323 of 20, combine (3+2+20) to result in the calculated value of "25" as output by the calculation system 130. The value for the task at step 310 may be used by the prioritization system 110 when generating the sequence schematic.

Figure 4:
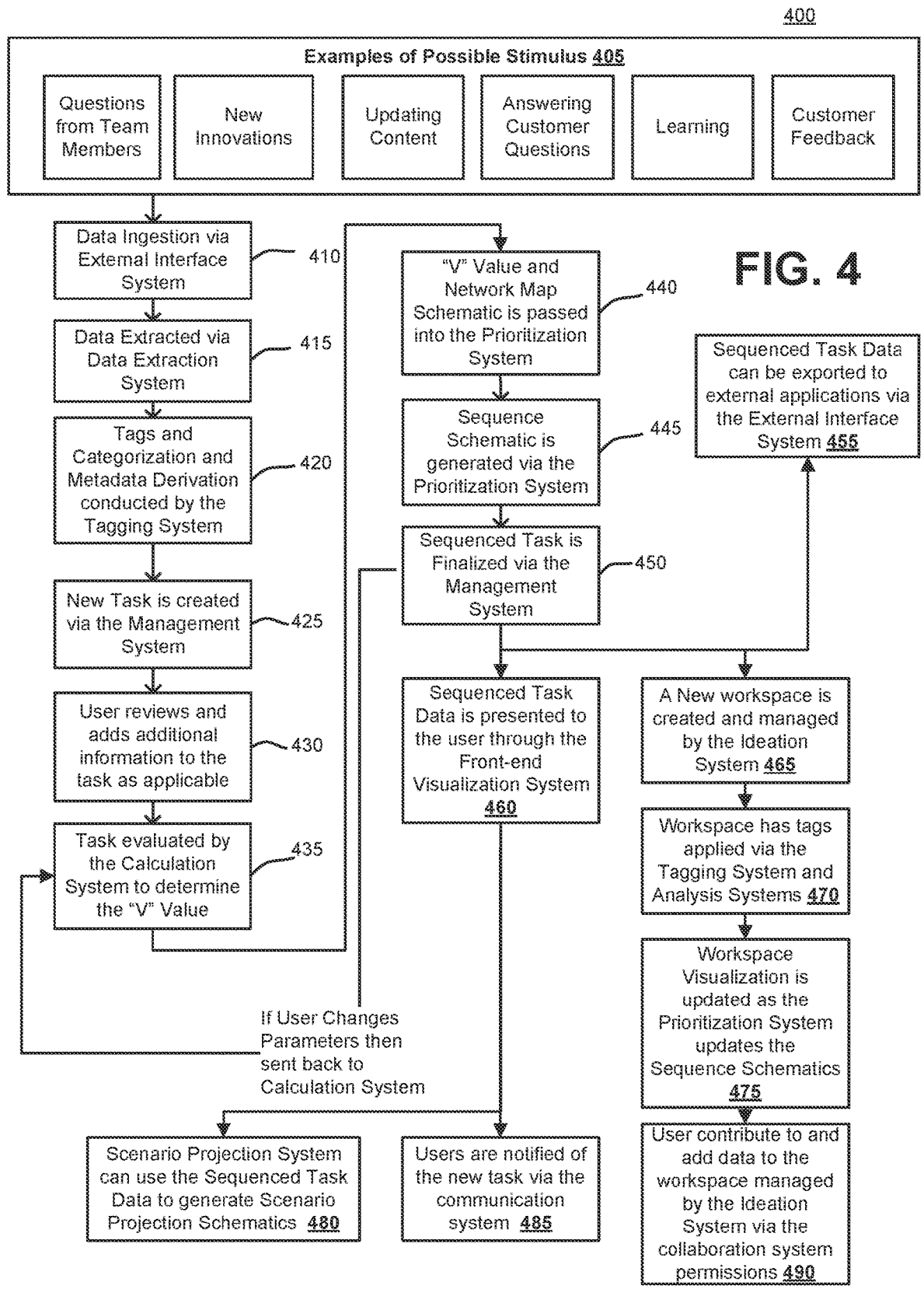
FIG. 4 illustrates a flow chart of an exemplary process for processing of a task, as the task moves through the various, in accordance with one or more embodiments.

FIG. 4 shows a flow chart illustrating an example process flow 400 of the creation and the processing of a task within system 100 and the steps the task takes as it moves through the various subsystems contained, for example, within system 100. The process starts with the initial stimulus in step 405.

The external stimulus, in some embodiments, could be any kind without limitation, some examples could include a customer feature request, or a competitor announcing a new product. In the illustrated embodiment, the initial stimulus may be, but not limited to, a question from a team member, a new innovation, and update the content, a response to a customer question, machine learning output, customer feedback, or any other internal or external stimulus that would be apparent to one of skill in the art in possession of the present disclosure.

At step 410, the system 100, ingests the raw stimulus, or direct user input, into a set of data that can be utilized within the system 100 using the external interface system 150. The external interface system 150 may include various API to interact with external or internal data sources.

In step 415, in some embodiments, the ingested data moves through the Data Extraction System 145, where the raw data is processed into processed data. The data extraction system 145 may process the raw data into processed data according to various processes. For example, the data extraction system 145 may use the chunking algorithm, discussed above, to process the raw data into processed data.

The process data may be used to generate tags in step 420 and tasks in step 425. Specific tasks may be used within other parts of the system 100. The extracted tasks, in some embodiments, are then each individually tagged, categorized, and analyzed for metadata by the tagging system 115. The tagging system 115 may flag words or keywords of significance that are part of the chunked processed data, such as "Critical", "Important", or "Valuable" which would give additional context to the value placed on the task by the employees discussing it. At step 425 each new task with its complete metadata is added to the system 100 database via the management system 120. The user, in some embodiments, is then able to add additional information to the task as applicable via the management system in step 430. The data ingestion, the data extraction, the task generation, and that tag generation is further discussed below with reference to FIG. 6.

Figure 5:
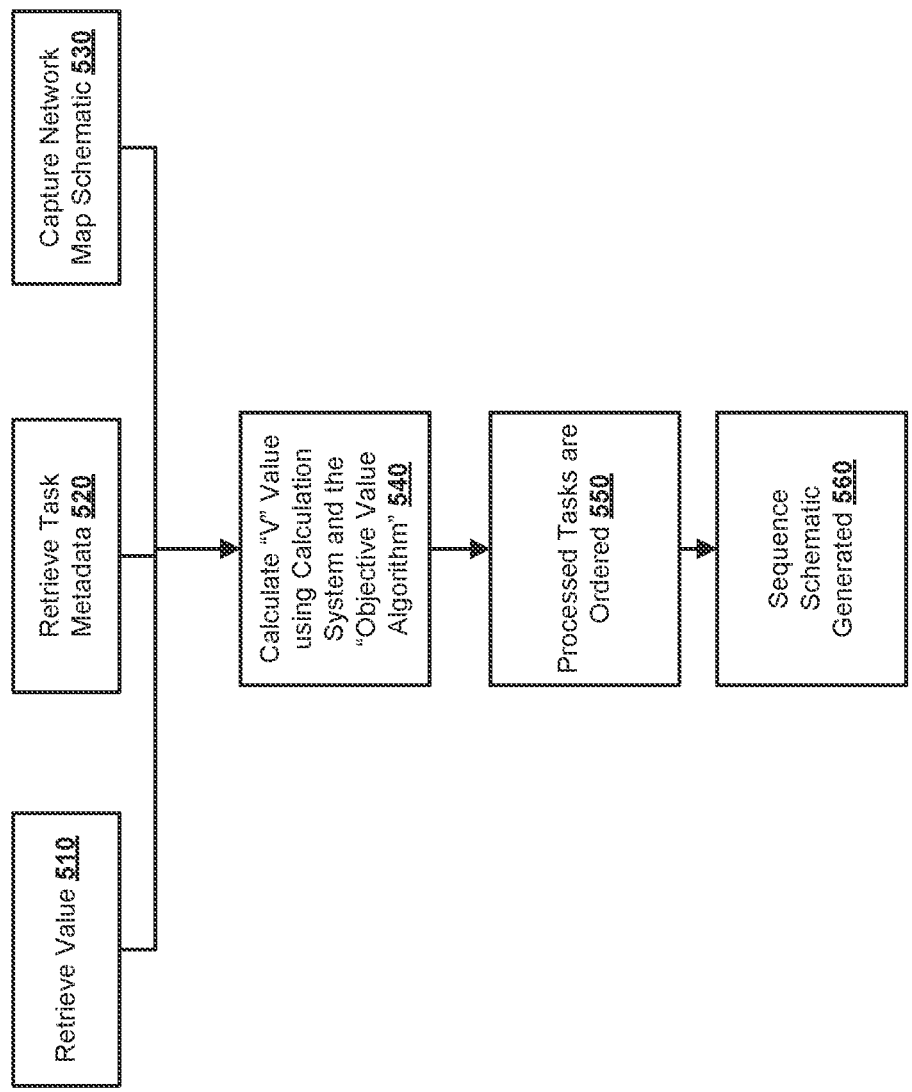
FIG. 5 illustrates a flow chart of an exemplary process for generating a sequence schematic, in accordance with one or more embodiments.

At step 435, in some embodiments, the task is then evaluated using the calculation system 130 to determine the value ("V") of each individual task. The "V" value and the Network Map Schematic created by the management system 120 (an example of which is illustrated in FIG. 9), in some embodiments, are sent to the prioritization system 110 for ordering in step 440. Using the prioritization system 110, in some embodiments, the values and Network Map Schematics provided are used to create a Sequence Schematic in step 445. FIG. 5 further illustrates the process of determining the value of each individual task and ordering the individual tasks.

At step 450, in some embodiments, the user is then able to review and adjust the Sequenced Task using the management system 120. If the user modifies the Sequenced Task, it will be sent back to the calculation system 130 for recalculation at step 435.

After the task is Finalized in step 450, in some embodiments, the Finalized Task Sequence Schematic and Sequenced Task data may be sent to various other systems within the system 100 or stored in the database 105. At step 455, if the user requires Sequenced Task data to be sent to an external application, then the data can be provided using the external interface system 150, in some embodiments. At step 460, if the user requires the sequenced task data to be presented to the user through the front-end visualization system 135, then the sequenced task data may be sent to a user interface included on a user computing device. In some embodiments, the sequenced test data may be sent through the network 104 to the computing device 101

The User may then interact with the Sequenced Task data to create Scenario Projections within the scenario projection system 155 as shown in step 480. Further in step 485, in some embodiments, upon creation of the Sequenced Task data, the communication system 140 will notify the users of the creation of the new Sequenced Task data entry depending on the user's notification preferences. Concurrently the Sequenced Task data can be presented to the user via a graphical user interface utilizing the front-end visualization system 135.

Also, concurrently with step 455 and step 460, in some embodiments, the Sequenced Task data is sent to the ideation system 160 where a new Workspace is created in step 465. Each new task in the system 100 may receive its own dedicated Workspace.

The ideation system 160, in some embodiments, reads the Sequenced Task data and interfaces with the tagging system 115 and the analysis system 125 to associate applicable task tags and metadata with the newly Workspace as shown in step 470. As the tasks in the system 100 are updated either manually or through external stimulus, the calculation system 130 and the prioritization system 110 may recalculate their applicable values and prioritizations and generate new Sequence Schematics.

The ideation system 160 may interface with these systems in real-time and make the applicable adjustments to the Workspace visualization as changes occur in connection with the front-end visualization system 135 as shown in step 475.

Based on the permissions for accessing and modifying data within the system 100 via the Collaboration system 165, users may be able to interface with the ideation system 160 to contribute and add new data to each individual Workspace as applicable as shown in step 490. The Workspaces can also be configured to automatically add processed data directly from the Data Extraction system 145.

In some embodiments, the task assigned to a workspace may include content creation. The workspace and task may be linked to a content creation application as described in U.S. patent application Ser. No. 16,434,293, titled "System and Method for Content Creation and Delivery," filed Jun. 7, 2019, and which is incorporated herein by reference in its entirety. For example, a task in the system "build sales presentation for XYZ company" could inform a dynamic user interface that connects to a content creation application where the user answers a set of questions (e.g., 5 or more questions) about the customer (customer name, line of business, industry vertical, products/services interested in purchasing, etc) and based on those answers, the content creation application builds the presentation.

In various embodiments, the content creation application may receive a user's content request. The content creation application may filter and extract data corresponding to one or more outcomes requested by the user. The content creation application may process and synthesize filtered data to prepare one or more pieces of content associated with one or more outcomes, convert the content into a desired format, and format the content for delivery to the user to complete the task.

FIG. 5 shows a flow chart illustrating an example process flow 500 through which a Sequence Schematic is generated as discussed above with respect to steps 435, 440, 445, and 450 of the process flow 400 of FIG. 4. The calculation system 130, in some embodiments, first receives the key data from the other systems within system 100. In some embodiments this data includes receiving the Value of the task at step 510, the Metadata and tags associated with the task at step 520, and the current state of the task network in the form of the Network Map Schematic at step 530. The calculation system 130, in some embodiments, then utilizes the three sets of information and the "Objective Value Algorithm" as outlined in Table 1, at step 540. All individual tasks are processed at step 540, in some embodiments, are then combined into a dataset where the processed tasks are ordered by the prioritization system 110 at step 550. The ordered sequence output of the dataset is compiled into the Sequence Schematic at step 560.

Figure 6:
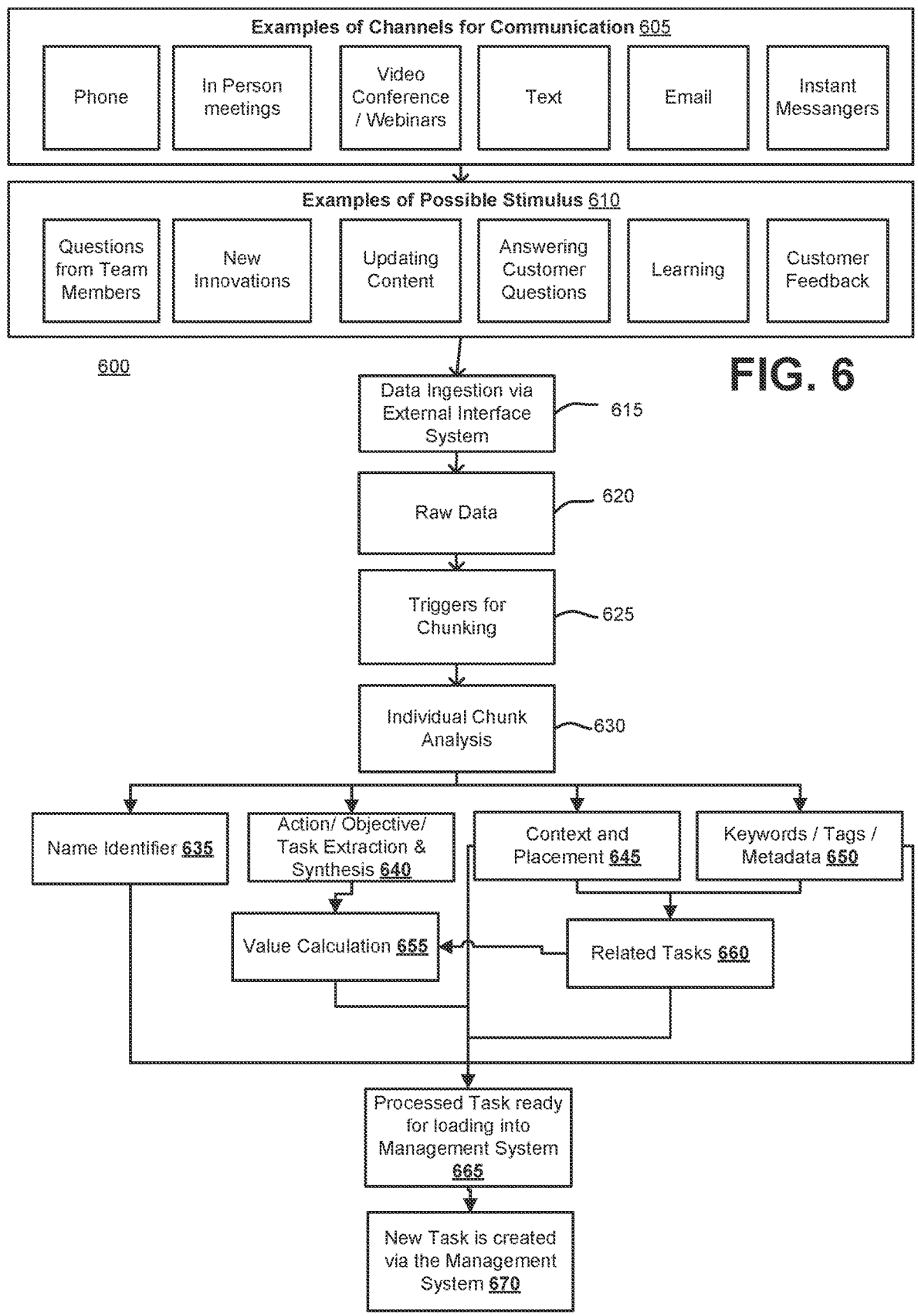
FIG. 6 illustrates a flow chart of an exemplary process for processing external raw data, in accordance with one or more embodiments.

FIG. 6 shows a flow chart illustrating an example process flow 600 through which external raw data from the external interface system 150 can be processed by the Data Extraction System 145 and the analysis system 125 before being added to the management system 120. The process flow 600 may coincide with steps 405-425 of process flow 400 of FIG. 4.

The processing of external data, in some embodiments, begins with the capture of the external data from a variety of communication channels at step 605. For example, a channel of communication may include a phone conversation, and in person meeting, and audio-visual stream of a videoconference, text message, and email, instant message, or any other form of communication channel that would be apparent to one of skill in the art in possession of the present disclosure. In a specific example, an audio recording device or computer text scraping device that include a natural language processor may collect raw input signals.

At step 610, in some embodiments, the data contained within the communication channel could include a variety of types of communication in data such as customer feedback, a request from a manager, an external market force, a question from a team member, a new innovation, an update to data and content, in answer to a customer question, and output from a machine learning algorithm, or any other possible stimulus as described elsewhere in this document or that would be apparent to one of skill in the art in possession of the present disclosure.

The raw data, in some embodiments, is ingested using the external interface system 150 as shown at step 615. In some embodiments, ingestion of the raw data may be via the communication system 140, which may include various internal APIs or external APIs.

At step 620, in some embodiments, the raw data once inside the system 100 will be processed by the Data Extraction System 145 where various triggers configured within the Data Extraction System 145 will be activated and raw data is segmented into individual chunks of data at step 625. For example, the raw data may be processed using the chunking algorithm included in the data extraction system 145. In some embodiments, the chunking algorithm may include parameters such as the base value of the current state value of the chunk (X), the sum of all modifier factors (V), and require such output to be greater than the cutoff threshold (Z) for the instruction to be considered true. In some embodiments, the formula, when evaluated, must present an output where the value is greater of the cut-off threshold (Z), results in an output that is considered false. In other embodiments the chunking algorithm may not use a current state value at all and instead simply rely on the sum of all modifier factors to evaluate the expression. Additionally, the algorithm may apply an absolute value or exponents of the algorithm before comparing output value to that of the cut-off threshold "Z."

At step 630, in some embodiments, the individual chunks of data can then be processed further by the system 100 to extract key information required to create the Processed Task Schematic. The process task schematic may be used as a reference file for the next steps of the process since it may comprise the base structure and data of the task.

The tagging system 115 and the analysis system 125 may work together to analyze the chunk of data and extract a reference name (e.g., a Task Name Identifier data) for the task at step 635. The same systems may also analyze the language and context of the task from the chunk and the raw data it was extracted from to synthesize the task or objective at step 640. The same systems analyze the context (e.g., Context and Placement data) of the task in relation to the rest of the raw data stream as well as the other tasks that already exist within the system 100 as shown at step 645. The same systems may analyze chunk of data and other related chunks from the same dataset to derive a set of tags and metadata as shown at step 650.

At step 650, in some embodiments, the Tags and Metadata in conjunction with the Context and Placement data from step 645 are utilized by the analysis system 125 to determine existing related tasks within the system to generate a Related Task and Similarity Schematic. For example "John Smith, can you please create a sales presentation for XYZ customer" would be labeled with name "Create Sales Presentation for XYZ Customer", action would be "create a sales presentation", context and placement would be "John Smith", metadata would be the data, etc.

At step 655, in some embodiments, the Related Task and Similarity Schematic is used in conjunction with the synthesized task action from step 640 to generate an approximated Value (e.g., Value Calculation data) of the task based on the significance and importance of the task related to other similar tasks in the system as informed by the Related Task and Similarity Schematic and other keywords and metadata derived from step 645 and step 650. For example, the value calculation may include a dollar deal size for XYZ customer purchasing the products as a foundational value.

At step 660, the Related Task and Similarity Schematic data may be analyzed to determine related tasks. For example, related tasks may be other actions with a common identifier (e.g., other actions for XYZ customer). At step 665, the new task's Name Identifier data from step 635, Value Calculation data and Related Task and Similarity Schematic from step 655, Context and Placement data from step 645, from 55, and the Keyword and Tag Metadata 650 may be all combined to create a Processed Task Schematic which can be loaded into the management system 120. The management system 120, in some embodiments, then creates the finalized new task in the database using the Processed Task Schematic as shown at step 670.

Figure 7:
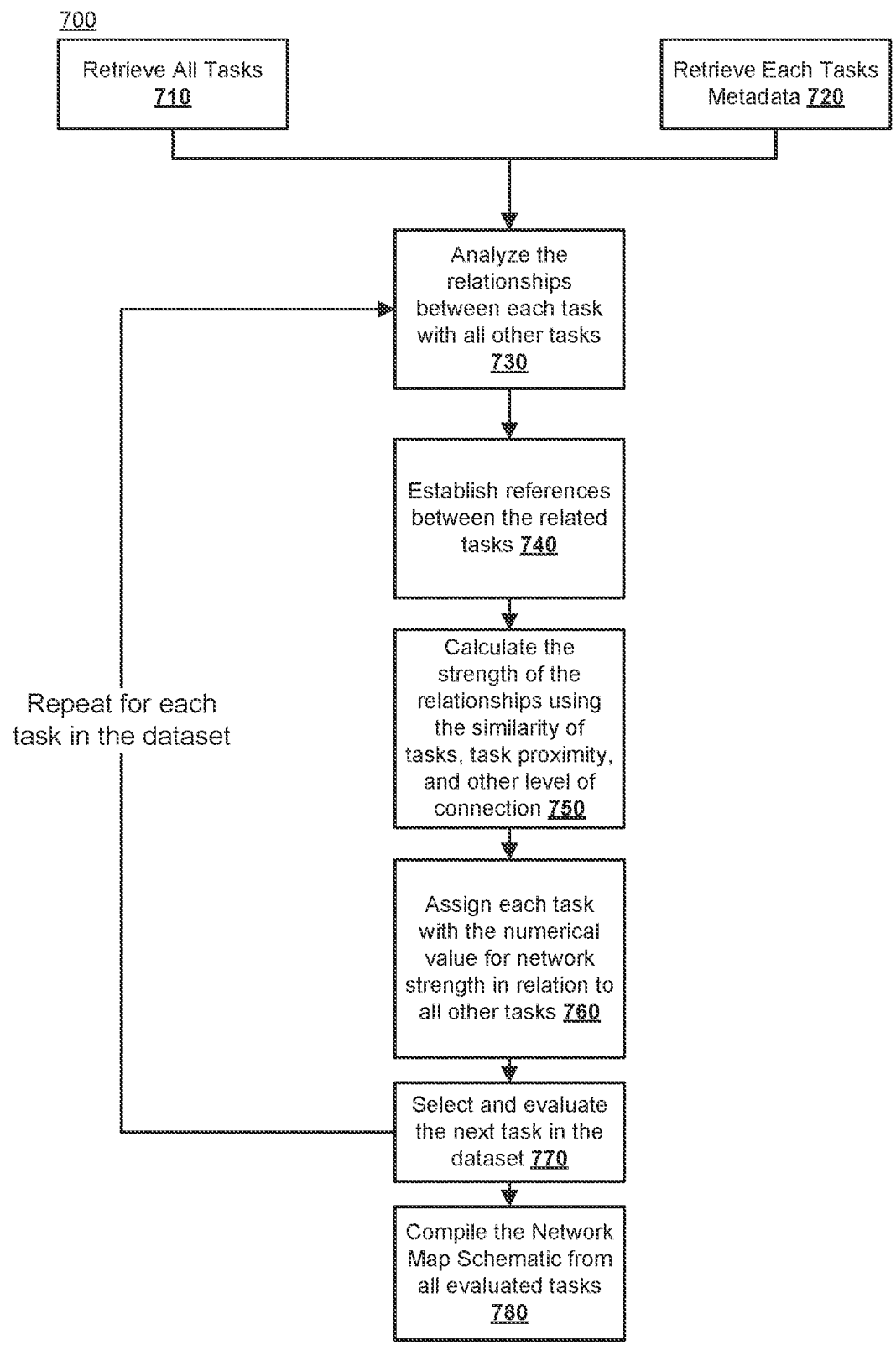
FIG. 7 illustrates a flow chart of an exemplary process for generating a network map schematic, in accordance with one or more embodiments.

FIG. 7 shows a flow chart illustrating an example process flow 700 through which a Network Map Schematic is generated. As discussed above, the network map schematic generated by the management system 120 and may be used by the prioritization system 110 when prioritizing and ordering the tasks.

The management system 120, in some embodiments, first retrieves all tasks in the system at step 710. For example, management system 120 may retrieve user created tasks or system created tasks that were generated during process flow 600 of FIG. 6. The management system 120 may also retrieve the metadata associated with each task at step 720.

The analysis system 125, in some embodiments, utilizes the metadata from each task to analyze the relationships between each task individually as it relates to all other tasks at step 730. The analysis system 125, in some embodiments, then uses the metadata to establish relationships between the selected task and all other tasks in the system at step 740.

The analysis system 125 in conjunction with the calculation system 130, in some embodiments, computes the strength of the relationships between the tasks through an evaluation of task similarity, metadata similarity, task proximity and location, level of connection between the tasks and other key factors at step 750. Upon completion of the calculations, in some embodiments, each task is assigned the output value from the systems at step 760.

The management system, in some embodiments, then begins to evaluate the same process for the next task in the queue, and this process is repeated for all tasks in the at step 770.

Upon the completion of all tasks in the dataset, in some embodiments, the management system 120 compiles a finalized Network Map Schematic from all the evaluated tasks in the dataset at step 780.

FIG. 8 shows a flow chart illustrating an exemplary process 800 through which the tasks are filtered and organized based on tags and metadata provided by the tagging system 115 and the analysis system 125. At step 810 a series of tasks 820 may be received and filtered. Tasks which match the tag "Revenue Growth" 830 are included in a filtered result.

At step 840 another result of tasks 860 may be generated by filtering the tasks with multiple tag filter parameters 850. In the system there is no limit to the number of tags used to filter the tasks and process 800 is just to illustrate two possible scenarios of many. For example, the number of tags used to filter the tasks may be based on four parameters, five parameters, six parameters, or any other dimensionality that would be appearance one of skill in the art the position of the present disclosure. The filtering and grouping of tasks by tags and other metadata parameters may be utilized when data is being processed by the analysis system 125, the tagging system 115, the calculation system 130, the scenario projection system 155, or other systems within the system 100 such as the ideation system 160.

FIG. 9 shows a flow chart illustrating an example process flow 900 through which metadata can be inherited by subtasks or to networked tasks relative to their relationships between the tasks. In some embodiments the system 100 may contain both hierarchical and networked relationships. The Top-Level Origin 910 is the container which holds the various tasks in this example. Task 1 911 is within the hierarchy and is directly assigned Tag 1 912. Task 2 913 is below Task 1 911 in the hierarchy. Task 2 912 is directly assigned Tags 2 and 3 914. Task 3 915 is below Task 2 in the hierarchy. Task 3 915 inherits Tag 1, Tag 2, and Tag 3 from Task 1 and Task 2 as shown in inherited tags 916. Task 4 and Task 5 are intended to illustrate there is no limit to the number of tasks in the hierarchy. Task 6 917 is directly assigned Tag 4 and Tag 5 918 in addition to inheriting Tag 1, Tag 2, and Tag 3 919 from Task 2 in 913.

Task 7 920 is within the hierarchy and directly assigned Tag 6 921. Task 8 922 is below Task 7 in the hierarchy. Task 8 922 is directly assigned Tags 7 923. A second occurrence of Task 3 924 is below Task 8 in the hierarchy. The second occurrence of Task 3 924 is the same Task 3 915 but with a different set of values as defined by the position in the network. The second occurrence of Task 3 924 inherits Tag 6 and Tag 7 from Task 7 and Task 8 925.

As part of producing the Network Map Schematic, the management system 120, in some embodiments, aggregates the multiple entries of Task 3 915 and the second occurrence of Task 3 924 into a single Networked Task 3 926, this aggregation process is repeated for any repeated tasks across the system. The Networked Task 3 926 receives the properties and data associated with all Task 3 entries across the system (e.g., Task 3 915 and the second occurrence of Task 3 924). Networked Task 3 from 926 inherits Tag 1, Tag 2, and Tag 3 915 and Tag 6 and Tag 7 924 as shown in Networked Tags 927. As described elsewhere, the strength and relationship between the Networked Task 3 926, and the inherited tags in Networked Tags 927 will be determined by the strength, position, and context of each individual task in the system.

Figure 10:
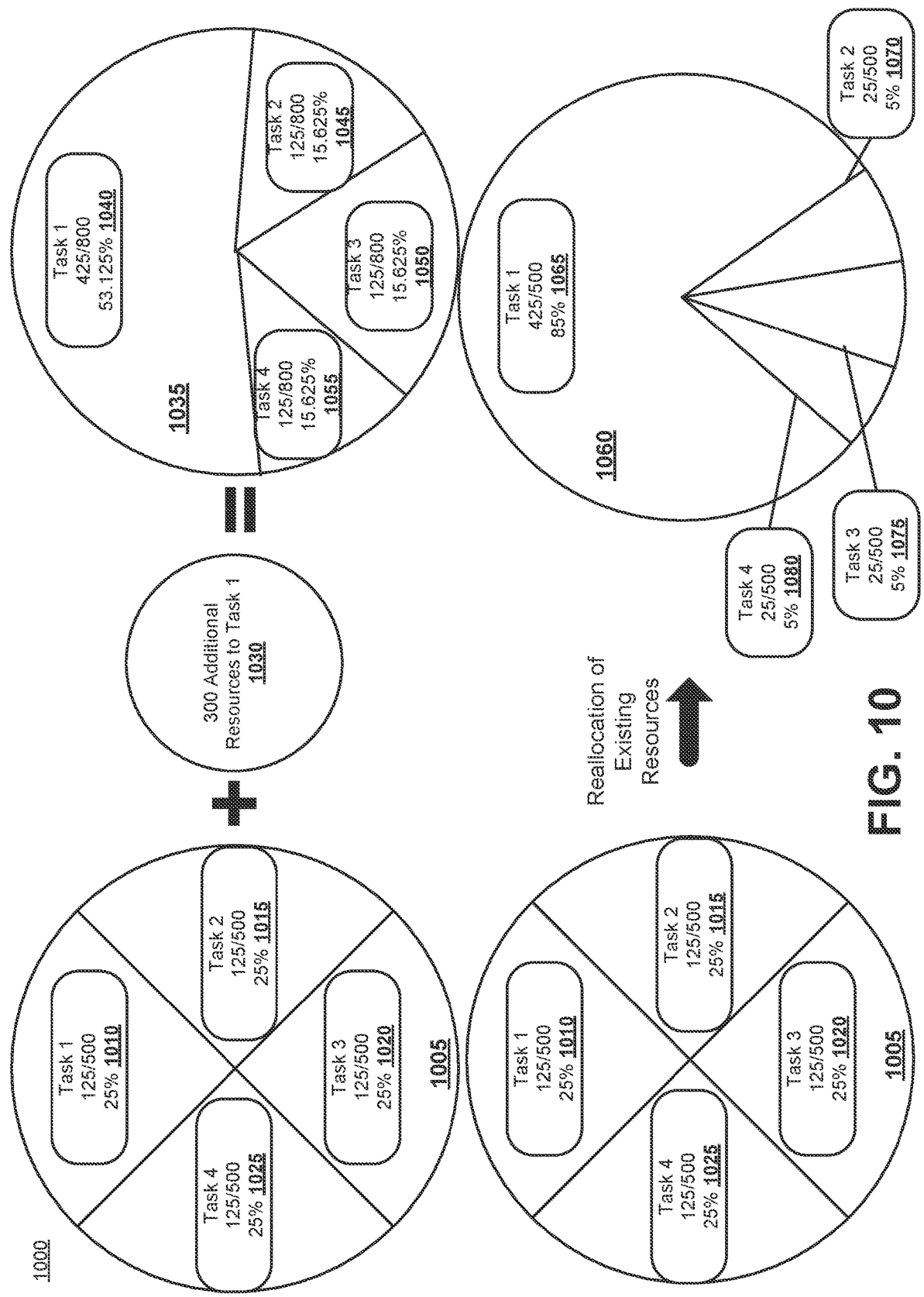
FIG. 10 illustrates a chart of exemplary physical calculation restraint parameters, in accordance with one or more embodiments.
Figure 11:
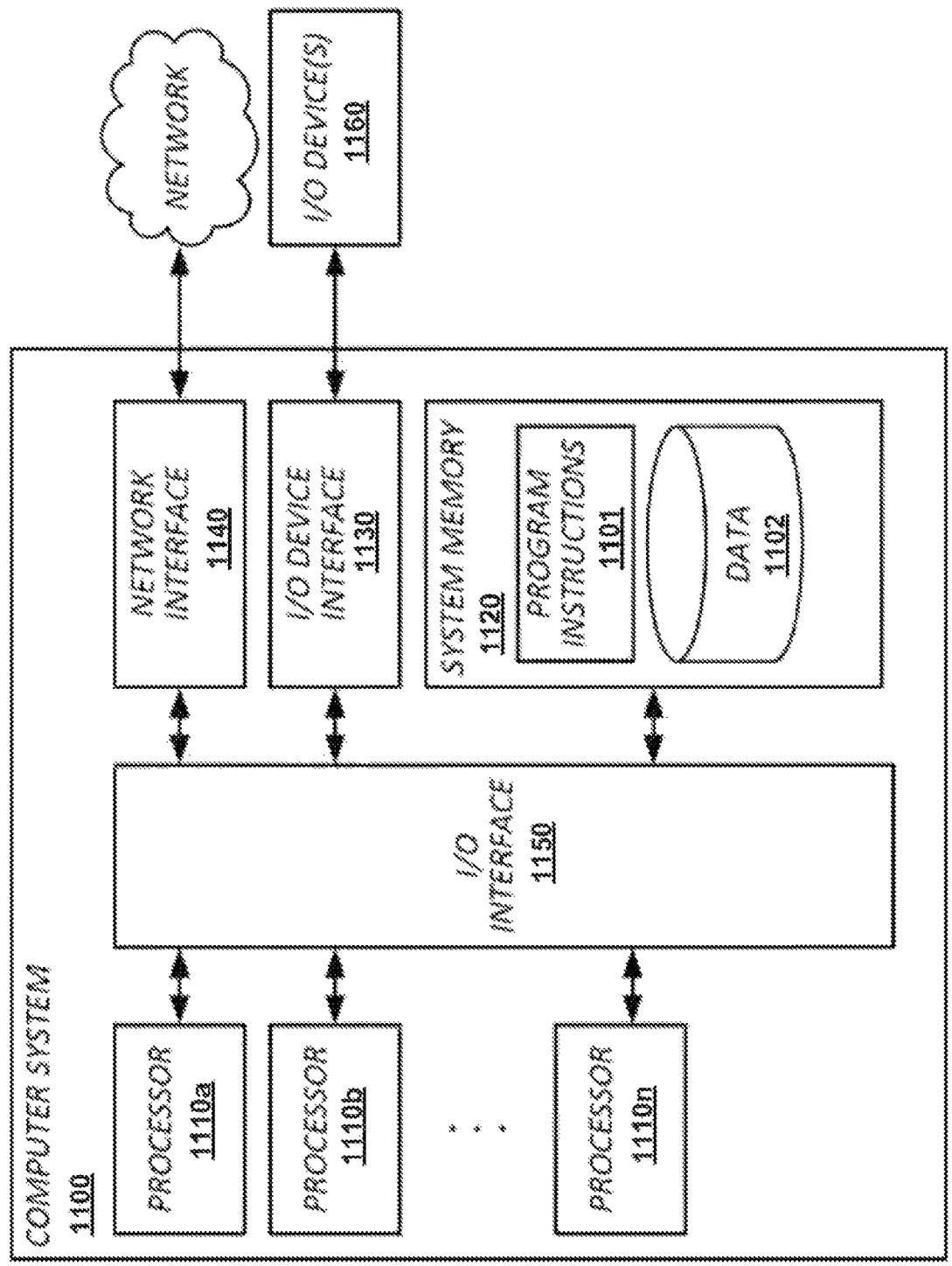
FIG. 11 illustrates an example computing device by which the present techniques may be implemented in some embodiments.

FIG. 10 shows an example chart 1000 illustrating the requirement to maintain 100% of the metric being used within the calculation system 130 and in the instance the current metric must be exceeded, then the fraction making up the 100% may be adjusted to account for the growth without exceeding 100%. While this example illustrates the concept using the term "resources" this same principle could be applied to any quantifiable or quantifiably derivable metric used within an organization to track or measure.

Circle chart 1005 represents 100% of the available resources (500 resources in total) allocated within an organization. In this example, the resources have been evenly allocated between four tasks, with each task, Task 1 1010, Task 2 1015, Task 3 1020, and Task 4 1025, receiving 25% of the available resources (125 resources each out of 500 resources total). As discussed above, the resources may include personnel resources, computer hardware or software resources (e.g., network bandwidth, processor resources, memory resources, workload resources, storage resources, or any other computing resources that would be apparent to one of skill in the art position present disclosure), power resources, cooling resources, manufacturing resources, or any other resources that would be apparent to one of skill in the art position the present disclosure.

If the organization wishes to increase the resource allocation to Task 1 1010 as shown in region 1030 by 300 resources while maintaining the same resource allocation of 125 resources per task to Task 2 1015, Task 3 1020, and Task 4 1025, then the organization must add additional resources to the total available resources.

The result of adding 300 additional resources is represented in region 1035 where Task 1 1010 has increased from 125 resources in to 425 resources in region 1040. Region 1045, region 1050, and region 1055 show that Task 2, Task 3, and Task 4 respectively have not changed the number of resources allocated, with each task still receiving 125 resources, although the percentage of total resources allocated to each task has changed due to the increase as depicted in region 1030.

If the organization wishes to reallocate resources to bring Task 1 1010 with 125 resources to 425 resources without adding additional resources to the whole as depicted in region 1060, the reallocation will shift resources from the existing tasks Task 2 1015, Task 3 1020, and Task 4 1025 in some proportion to Task 1 as shown in region 1065. In this example, the resources are shifted proportionately but could be allocated in any arrangement favoring one task or another as shown in region 1060. In this example, Task 1 has received 425 of 500 available resources shown in region 1065, Task 2 has received 25 of 500 available resources 1070, Task 3 has received 25 of 500 available resources 1075, and Task 4 has received 25 of 500 available resources 1080. The allocation of values is calculated by the calculation system 130 in conjunction with the management system 120 and sometimes will utilize the front-end visualization system 135 to allow the user to provide input as part of the process.

The system 100, in some embodiments, is configured to operate with any content in any medium. Due to the complexities found within the creation of each content medium, a separate sub-system is used to create content in each medium.

The system 100, in some embodiments, stores multiple redundancies of the data to ensure constant uptime and data protection. The system encrypts the data so that it cannot be accessed without direct involvement by an authorized user. Users may obtain an encrypted backup copy of the data from the system.

Over time, some tasks in the system 100 may become completed or outdated and may need to be removed or updated. The system 100 may replace a task using an update system that requires permission from either an administrator of the system 100 or the user. A user may flag a task in the system 100 for completion, deletion, archive, or other options to manage the status of a task in the system 100.

Completed tasks, in some embodiments, are sent to a completed task section of the database 105, wherein the tasks are dated and tagged with relevant data, such as the information associated with the tagging system 115. If needed, these tasks may be brought back into circulation in the system 100 upon request from an administrator or authorized user. When tasks are removed or added to the system the calculation system 130 will recalculate the allocation of the metrics being used to ensure compliance with the system requirements as outlined in FIG. 10.

The system 100 may also be adapted to evaluate a specific organization, to determine which tasks in the system 100 would best be identified to accomplish the desired strategic objectives. Specifically, the external interface system 150, the tagging system 115, the analysis system 125, calculation system 130, and the scenario projection system 155 may review all publicly available information about the other company to determine what is most important to that company by understanding the priorities, sentiment, goals, and objectives of that organization, frequency of certain words used, etc. The system 100 then uses that information and identifies the tasks that are most in accordance with the objectives of that organization and makes recommendations based on that information.

The management system 120 may also display statistics relevant to users being able to understand if a task is beneficial using data points, such as the value of the completed task; the dependencies that the task fulfills, and other information determined by the scenario projection system 155.

In some examples, the system 100 applies an interest rate on the values assigned to each task based on additional data associated with the management system 120 and the prioritization system 110. The data may be adapted to determine the interest rate of a task based on the date that the task was created in the system 100 in conjunction with other relevant metadata such as task due date or delays; certain tasks may be flagged for a refresh or revisitation after a certain number of days since the last update in the system 100 has been reached; and compare new versus old statuses of a tasks to determine the amount of progress between the versions based on designated metrics, sentiment, tone, word choice, keywords, etc.

The system 100, in some embodiments, may be used for various types of applications and industries, such as organizational management, task prioritization, resource allocations, logistics and transportation networks such as the mailing of packages or allocation of seats and destinations in self driving car networks, medical triage and healthcare treatment, financial planning, software development, dependency tracking, harvesting agricultural products to maximize nutrition, freshness and value, and scenario mapping. There are numerous potential end users for the system 100, such as companies, individuals, agencies, associations, governments, the non-organizational use cases discussed above, etc.

Thus, systems and methods of the present disclosure provide an algorithm takes a highly unique view in assigning priority to tasks. A unique aspect about the algorithm is that it is highly flexible as to what type of numbers it can use for the base calculations. It may not matter if the algorithm is using financial dollar numbers, a ratio of some key metric preferred by the organization (like profitability to headcount), the volume of a package in cubic centimeters, computer hardware or software resource usage values, or other numerical value. This flexibility allows the organization to feed data into the algorithm from any number of external systems or data sets via API.

The algorithm may determine a numerical value based on the contextualized relationships of all the tasks in the system. The algorithm mays not have to be a single math equation but may rather be a series of math equations combined with a series of logical actions taken by the system between each math equation which ultimately results in the calculation of the final output priority ranking.

In some embodiment, using math alone would trigger false positives in the priority of certain tasks when imperfect (real world) data is used. Real-world data means that sometimes humans forget to input certain tasks or overlook certain actions. A system built on math alone may not account for these irregularities and therefore a logic layer, discussed further herein, is needed to aid in cleaning of the data. However, the cleaning may be completed in a fashion that allows for the cleaning method (of which there are many) to only be applied in certain relevant situations. Thus, combining the algorithm with the other factors of Collection, Organization, and Delivery, is a way to achieve substantive value from the systems and methods of the present disclosure.

Human interaction with the system while the system is live and running will also not break the algorithm as the algorithm continuously re-calculates itself as new tasks are completed to maintain an always up to data "state of the world" and human interactions are just treated like any other update made programmatically by the system as tasks are updated.

Another important factor is that the basis of the theory behind the algorithm is that an organization can only ever have 100% resources—meaning capacity can be increased, but never over extended (e.g., cannot have 25 hours in a day).

Furthermore, as described above, the system is highly flexible in scalability/number of tasks, system integrations (e.g., APIs), data cleanliness, and human interaction/human course correction. Without taking measures to account for this required flexibility and scalability, the system would be very fragile and brittle and like conventional systems and quickly become stale and irrelevant within the context of the organization's needs. Therefore, the systems and methods of the present disclosure may maintain relevance and value to the organization by accounting for these, and other, factors of scalability and flexibility. For example, the systems and methods of the present disclosure may be able to account for different levels of rigidity in what order tasks are completed. This may mean that the algorithm/system may not break even if an employee decides to complete task #5 before task #1 because of some external human reason. The agility and flexibility of the system and how it can account for such unforeseen course corrections is also a unique factor. These and other benefits and improvements to computer systems and other technologies may be realized by one of skill in the art in possession of the present disclosure.

FIG. 1100 is a diagram that illustrates an exemplary computing system 1100 in accordance with embodiments of the present technique. Various portions of systems and methods described herein, may include or be executed on one or more computer systems similar to the computing system 1100. For example, computing device 101 or the remote server 103 may be provided by computing system 1100. Furthermore, the prioritization system 110, the tagging system 115, the management system 120, the analysis system 125, the calculation system 130, the front-end visualization system 135, the communication system 140, the data extraction system 145, the external interface system 150, the scenario projection system 155, the ideation system 160, or the collaboration system 165 may be provided by the computing system 1100. Further, processes and modules described herein may be executed by one or more processing systems similar to that of computing system 1100.

Computing system 1100 may include one or more processors (e.g., processors 1110a-1110n) coupled to system memory 1120, an input/output I/O device interface 1130, and a network interface 1140 via an input/output (I/O) interface 1150. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1100. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1120). Computing system 1100 may be a uni-processor system including one processor (e.g., processor 1110a), or a multi-processor system including any number of suitable processors (e.g., 1110a-1110n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1100 may include a plurality of computing devices (e.g., distributed computer systems) to implement various processing functions.

I/O device interface 1130 may provide an interface for connection of one or more I/O devices 1160 to computer system 1100. I/O devices may include devices that receive input (e.g., from a user) or output information (e.g., to a user). I/O devices 1160 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1160 may be connected to computer system 1100 through a wired or wireless connection. I/O devices 1160 may be connected to computer system 1100 from a remote location. I/O devices 1160 located on remote computer system, for example, may be connected to computer system 1100 via a network and network interface 1140.

Network interface 1140 may include a network adapter that provides for connection of computer system 1100 to a network. Network interface may 1140 may facilitate data exchange between computer system 1100 and other devices connected to the network. Network interface 1140 may support wired or wireless communication. The network may include an electronic communication network, such as the Internet, a local area network (LAN), a wide area network (WAN), a cellular communications network, or the like.

System memory 1120 may be configured to store program instructions 1101 or data 1102. Program instructions 1101 may be executable by a processor (e.g., one or more of processors 1110a-1110n) to implement one or more embodiments of the present techniques. Instructions 1101 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1120 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1120 may include a non-transitory computer readable storage medium that may have program instructions stored thereon that are executable by a computer processor (e.g., one or more of processors 1110a-1110n) to cause the subject matter and the functional operations described herein. A memory (e.g., system memory 1120) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1150 may be configured to coordinate I/O traffic between processors 1110a-1110n, system memory 1120, network interface 1140, I/O devices 1160, and/or other peripheral devices. I/O interface 1150 may perform protocol, timing, or other data transformations to convert data signals from one component (e.g., system memory 1120) into a format suitable for use by another component (e.g., processors 1110a-1110n). I/O interface 1150 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1100 or multiple computer systems 1100 configured to host different portions or instances of embodiments. Multiple computer systems 1100 may provide for parallel or sequential processing/execution of one or more portions of the techniques described herein.

Those skilled in the art will appreciate that computer system 1100 is merely illustrative and is not intended to limit the scope of the techniques described herein. Computer system 1100 may include any combination of devices or software that may perform or otherwise provide for the performance of the techniques described herein. For example, computer system 1100 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1100 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory computer-readable medium that stores a computer program, the computer program including instructions that, when executed by a computer, cause the computer to perform operations comprising: receiving, by a computer system, a plurality of tasks; assigning, by the computer system, a context tag to each of the plurality of tasks based on a comparison between the plurality of tasks and existing tasks stored in a database; filtering, by the computer system, the plurality of tasks based on the context tag assigned to each of the plurality of tasks; calculating, by the computer system and for each of the plurality of tasks, task values associated with relationships between each of the plurality of tasks and any sub-tasks corresponding to each of the plurality of tasks; sorting, by the computer system, the task values and assigning prioritization to each of the plurality of tasks; and storing, by the computer system, the task values and the prioritization assigned to each of the plurality of tasks in the database.

2. The medium of embodiment 1, wherein the operations further comprise: receiving input data indicative of an action or timeline to be associated with the prioritization assigned to each of the plurality of tasks; in response to receiving the input data, determining whether applying the input data to the prioritization assigned to each of the plurality of tasks creates a conflict for any of the plurality of tasks, wherein the conflict is an indication that at least one of the plurality of tasks has been rendered incompletable; and in response to determining that applying the input data to the prioritization assigned to each of the plurality of tasks does not create conflict, transmitting instructions to assign one or more task associated with the plurality of tasks to at least one user.

3. The medium of any one of embodiments 1 or 2, wherein the operations further comprise: receiving, in response to the plurality of tasks being completed, feedback data; determining, using a neural network that analyzes the feedback data, weighting of at least one of an algorithm variable or an algorithm constant used for assigning prioritization; and updating the at least one of the algorithm variable or the algorithm constant in a prioritization model.

4. The medium of any one of embodiments 1-3, wherein the filtering the plurality of tasks based on the context tag assigned to each of the plurality of tasks includes grouping a first set of the plurality of tasks into a first task group when those tasks of the plurality of tasks includes a context tag that is the same.

5. The medium of any one of embodiments 1-4, wherein a first task of the plurality of tasks is a subtask of a second task.

6. The medium of embodiment 5, wherein the assigning the context tag to each of the plurality of tasks based on the comparison between the plurality of tasks and the existing tasks stored in the database includes: assigning a first context tag to the second task; and automatically assigning the first context tag to the first task in response to determining that the first task is the subtask of the second task.

7. The medium of embodiment 5, wherein the first task inherits hierarchical or networked relationships of the second task in response to the first task being the subtask of the second task.

8. The medium of any one of embodiments 1-7, wherein the operations further comprise: assigning a second task one or more of the plurality of tasks.

9. The medium of any one of embodiments 1-8, wherein a first task requires completion of a second task before the first task is completed.

10. The medium of embodiment 9, wherein the assigning the context tag to each of the plurality of tasks based on the comparison between the plurality of tasks and the existing tasks stored in the database includes: assigning a first context tag to the first task indicating that that second task requires completion before the first task.

11. The medium of any one of embodiments 1-10, wherein each task value for each task is calculated using an objective value algorithm that is based on a base value of that task, a network value of a position of that task in relation to other tasks of the plurality of tasks in a network, and a numerical value produced by a product of metadata and tag-based modifiers associated with that task.

12. The medium of embodiments 11, wherein the network value includes a weighting when localized values are incomplete.

13. The medium of any one of embodiments 11 or 12, wherein the weighting is applied when a set of logical rules is satisfied, wherein the set of logical rules includes at least one of counting a number of higher-level tasks of a task network from an evaluated task, determining a position of the higher-level tasks from the evaluated task, comparing the relationships between the evaluated task and the higher-level tasks, viewing a status of terminal tasks within the evaluated task and the higher-level tasks, or evaluating a hierarchy of the plurality of tasks and compare such hierarchical positioning to derived network relationships.

14. The medium of any one of embodiments 1-13, wherein the task includes content creation and the operations further comprise: receiving a user's content request via a content creation application on a computing device; filtering and extracting data corresponding to one or more outcomes requested by the user; processing and synthesizing filtered data to prepare one or more pieces of content associated with one or more outcomes; converting the content into a desired format; and formatting the content for delivery to the user.

15. The medium of any one of embodiments 1-14, wherein the operations further comprise: automatically creating one or more workspaces pre-configured for a user's ideation process using at least one of configuration settings, a sequence schematic of the plurality of tasks, or a network map schematic of the plurality of tasks; determining that the user completed at least a portion of a task in the workspace; and providing an award to the user for completing at least the portion of the task.

16. The medium of any one of embodiments 1-15, wherein the operations further comprise: ingesting raw data from an internal source or an external source; processing, using a chunking algorithm, the raw data into processed data; and generating, using the processed data, at least one of the plurality of tasks or at least one of the plurality of context tags.

17. The medium of embodiment 16, wherein the chunking algorithm includes parameters such as a base value of a current state value of a chunk, a sum of all modifier factors, and require an output to be greater than a cutoff threshold for the instructions to be true.

18. The medium of any one of embodiments 1-17, wherein the operations further comprise: generating, by applying a time-based scenario model to the task values and the prioritization assigned to each of the plurality of tasks in the database, a plurality of time-based scenarios; and presenting at least a portion of the plurality of time-based scenarios to a user, wherein the plurality of time-based scenarios projects possible outcomes of allocating resources to various tasks in the plurality of tasks.

19. The medium of any one of embodiments 1-18, wherein the operations comprise steps for applying the context tag to each of the plurality of tasks.

20. A method, comprising: receiving, by a computer system, a plurality of tasks; assigning, by the computer system, a context tag to each of the plurality of tasks based on a comparison between the plurality of tasks and existing tasks stored in a database; filtering, by the computer system, the plurality of tasks based on the context tag assigned to each of the plurality of tasks; calculating, by the computer system and for each of the plurality of tasks, task values associated with relationships between the tasks and any sub-tasks corresponding to each of the plurality of tasks; sorting, by the computer system, the task values and assigning prioritization to each of the plurality of tasks; and storing, by the computer system, the task values and the prioritization assigned to each of the plurality of tasks in the database.

What is claimed is:

1. A non-transitory computer-readable medium that stores a computer program, the computer program including instructions that, when executed by a computer, cause the computer to perform operations comprising:
   receiving, by a computer system, a plurality of tasks;
   assigning, by the computer system, a context tag to each of the plurality of tasks based on a comparison between the plurality of tasks and existing tasks stored in a database;
   filtering, by the computer system, the plurality of tasks based on the context tag assigned to each of the plurality of tasks;
   calculating, by the computer system and for each of the plurality of tasks, task values associated with relationships between each of the plurality of tasks and any sub-tasks corresponding to each of the plurality of tasks;
   sorting, by the computer system, the task values and assigning, using a prioritization model, prioritization to each of the plurality of tasks;
   storing, by the computer system, the task values and the prioritization assigned to each of the plurality of tasks in the database;
   transmitting, by the computer system, instructions to assign one or more tasks associated with the plurality of tasks to at least one user;
   receiving, by the computer system and in response to at least a portion of the plurality of tasks being completed, feedback data;
   determining, by the computer system and using a neural network that analyzes the feedback data, weighting of at least one of an algorithm variable or an algorithm constant used for assigning the prioritization; and
   updating, by the computer system, the at least one of the algorithm variable or the algorithm constant in the prioritization model.

2. The medium of claim 1, wherein the operations further comprise:
   receiving input data indicative of an action or timeline to be associated with the prioritization assigned to each of the plurality of tasks; and
   in response to receiving the input data, determining whether applying the input data to the prioritization assigned to each of the plurality of tasks creates a conflict for any of the plurality of tasks, wherein the conflict is an indication that at least one of the plurality of tasks has been rendered incompletable, wherein the transmitting the instructions to assign the one or more tasks associated with the plurality of tasks to the at least one user is in response to determining that applying the input data to the prioritization assigned to each of the plurality of tasks does not create conflict.

3. The medium of claim 1, wherein the filtering the plurality of tasks based on the context tag assigned to each of the plurality of tasks includes grouping a first set of the plurality of tasks into a first task group when those tasks of the plurality of tasks includes a context tag that is the same.

4. The medium of claim 1, wherein a first task of the plurality of tasks is a subtask of a second task.

5. The medium of claim 4, wherein the assigning the context tag to each of the plurality of tasks based on the comparison between the plurality of tasks and the existing tasks stored in the database includes:
   assigning a first context tag to the second task; and
   automatically assigning the first context tag to the first task in response to determining that the first task is the subtask of the second task.

6. The medium of claim 4, wherein the first task inherits hierarchical or networked relationships of the second task in response to the first task being the subtask of the second task.

7. The medium of claim 1, wherein the operations further comprise:
   assigning a second task one or more of the plurality of tasks.

8. The medium of claim 1, wherein a first task requires completion of a second task before the first task is completed.

9. The medium of claim 8, wherein the assigning the context tag to each of the plurality of tasks based on the comparison between the plurality of tasks and the existing tasks stored in the database includes:
   assigning a first context tag to the first task indicating that that second task requires completion before the first task.

10. The medium of claim 1, wherein each task value for each task is calculated using an objective value algorithm that is based on a base value of that task, a network value of a position of that task in relation to other tasks of the plurality of tasks in a network, and a numerical value produced by a product of metadata and tag-based modifiers associated with that task.

11. The medium of claim 10, wherein the network value includes a weighting when localized values are incomplete.

12. The medium of claim 11, wherein the weighting is applied when a set of logical rules is satisfied, wherein the set of logical rules includes at least one of counting a number of higher-level tasks of a task network from an evaluated task, determining a position of the higher-level tasks from the evaluated task, comparing the relationships between the evaluated task and the higher-level tasks, viewing a status of terminal tasks within the evaluated task and the higher-level tasks, or evaluating a hierarchy of the plurality of tasks and compare such hierarchical positioning to derived network relationships.

13. The medium of claim 1, wherein at least a portion of the tasks of the plurality of tasks includes content creation, and the operations further comprise:
   receiving, from a user, a user's content request via a content creation application;
   filtering and extracting data corresponding to one or more outcomes requested by the user;
   processing and synthesizing filtered data to prepare one or more pieces of content associated with the one or more outcomes;
   converting the content into a desired format; and
   formatting the content for delivery to the user.

14. The medium of claim 1, wherein the operations further comprise:

automatically creating one or more workspaces pre-configured for a user's ideation process using at least one of configuration settings, a sequence schematic of the plurality of tasks, or a network map schematic of the plurality of tasks;

determining that a user completed at least a portion of a task in the one or more workspaces; and providing a reward to the user for completing at least the portion of the task.

15. The medium of claim 1, wherein the operations further comprise:

ingesting raw data from an internal source or an external source;

processing, using a chunking algorithm, the raw data into processed data; and generating, using the processed data, at least one of the plurality of tasks or at least one of each context tag.

16. The medium of claim 15, wherein the chunking algorithm includes parameters such as a base value of a current state value of a chunk, a sum of all modifier factors, and require an output to be greater than a cutoff threshold for the instructions to be true.

17. The medium of claim 1, wherein the operations further comprise:

generating, by applying a time-based scenario model to the task values and the prioritization assigned to each of the plurality of tasks in the database, a plurality of time-based scenarios; and presenting at least a portion of the plurality of time-based scenarios to a user, wherein the plurality of time-based scenarios projects possible outcomes of allocating resources to various tasks in the plurality of tasks.

18. The medium of claim 1, wherein the operations comprise steps for applying the context tag to each of the plurality of tasks.

19. A method, comprising:

receiving, by a computer system, a plurality of tasks;

assigning, by the computer system, a context tag to each of the plurality of tasks based on a comparison between the plurality of tasks and existing tasks stored in a database;

filtering, by the computer system, the plurality of tasks based on the context tag assigned to each of the plurality of tasks;

calculating, by the computer system and for each of the plurality of tasks, task values associated with relationships between each of the plurality of tasks and any sub-tasks corresponding to each of the plurality of tasks;

sorting, by the computer system, the task values and assigning, using a prioritization model, prioritization to each of the plurality of tasks;

storing, by the computer system, the task values and the prioritization assigned to each of the plurality of tasks in the database;

transmitting, by the computer system, instructions to assign one or more tasks associated with the plurality of tasks to at least one user;

receiving, by the computer system and in response to at least a portion of the plurality of tasks being completed, feedback data;

determining, by the computer system and using a neural network that analyzes the feedback data, weighting of at least one of an algorithm variable or an algorithm constant used for assigning prioritization; and updating, by the computer system, the at least one of the algorithm variable or the algorithm constant in the prioritization model.

20. The method of claim 19, further comprising:

receiving input data indicative of an action or timeline to be associated with the prioritization assigned to each of the plurality of tasks; and in response to receiving the input data, determining whether applying the input data to the prioritization assigned to each of the plurality of tasks creates a conflict for any of the plurality of tasks, wherein the conflict is an indication that at least one of the plurality of tasks has been rendered incompletable, wherein the transmitting the instructions to assign the one or more tasks associated with the plurality of tasks to the at least one user is in response to determining that applying the input data to the prioritization assigned to each of the plurality of tasks does not create conflict.

* * * * *